(12) United States Patent
Amanuma et al.

(10) Patent No.: US 8,092,326 B2
(45) Date of Patent: Jan. 10, 2012

(54) VEHICULAR POWER TRANSMISSION APPARATUS

(75) Inventors: Hirokatsu Amanuma, Saitama (JP); Yasuaki Hotozuka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 304 days.

(21) Appl. No.: 12/465,211

(22) Filed: May 13, 2009

(65) Prior Publication Data
US 2009/0291794 A1 Nov. 26, 2009

(30) Foreign Application Priority Data

May 23, 2008 (JP) .................. 2008-135778
Jan. 14, 2009 (JP) .................. 2009-005635

(51) Int. Cl.
*F16D 1/104* (2006.01)
*F16D 13/04* (2006.01)
*F16H 63/08* (2006.01)
(52) U.S. Cl. ............... 474/74; 474/168; 474/84; 92/96; 92/99; 92/45
(58) Field of Classification Search .............. 474/148, 474/150, 70, 73, 74, 86, 84, 168, 169, 902, 474/171, 69; 192/45, 38, 47, 48.92, 96, 99 B, 192/35, 34, 44, 69.83, 108, 69.61, 69.62, 192/69.7, 69.71
See application file for complete search history.

(56) References Cited

U.S. PATENT DOCUMENTS

| | | | | |
|---|---|---|---|---|
| 4,662,861 A * | 5/1987 | Seung et al. | .................. | 474/86 |
| 4,969,857 A * | 11/1990 | Kumm | .................. | 474/49 |
| 5,112,281 A * | 5/1992 | Minato et al. | .................. | 474/84 |
| 5,722,909 A * | 3/1998 | Thomey | .................. | 474/87 |
| 5,827,143 A * | 10/1998 | Monahan et al. | .................. | 474/73 |
| 5,909,075 A * | 6/1999 | Heimark | .................. | 310/103 |
| 6,048,288 A * | 4/2000 | Tsujii et al. | .................. | 477/5 |
| 6,095,693 A * | 8/2000 | Fujiwara | .................. | 384/625 |
| 6,170,625 B1 * | 1/2001 | Tanaka | .................. | 192/45 |
| 6,679,367 B2 * | 1/2004 | Baker et al. | .................. | 192/219.3 |
| 7,316,628 B2 * | 1/2008 | Serkh | .................. | 475/312 |
| 7,867,119 B2 * | 1/2011 | Brunetiere | .................. | 474/84 |
| 2005/0092573 A1 * | 5/2005 | Fujiwara | .................. | 192/45 |
| 2006/0163021 A1 * | 7/2006 | Tsukada et al. | .................. | 192/55.61 |
| 2006/0185956 A1 * | 8/2006 | Yasui et al. | .................. | 192/35 |
| 2009/0005201 A1 * | 1/2009 | Shimamura et al. | .................. | 474/94 |
| 2009/0255741 A1 * | 10/2009 | Major et al. | .................. | 180/65.22 |

FOREIGN PATENT DOCUMENTS

JP 61-80127 U 5/1986
(Continued)

*Primary Examiner* — Michael Mansen
*Assistant Examiner* — Minh Truong
(74) *Attorney, Agent, or Firm* — Arent Fox, LLP

(57) ABSTRACT

In a motor generator pulley 122, a mechanical clutch 105 and a switching unit 132 are provided such that the mechanical clutch 105 is interposed between a first power transmission unit 104A and a second power transmission unit 104B and can transmit power even when an engine 102 serves as a drive element and a motor generator 103 serves as a drive element and when the motor generator 103 serves as the drive element and the engine 102 serves as the driven element, and that the switching unit 132 can switch, when at least one of the engine 102 and the motor generator 103 serves as a drive element, the mechanical clutch 105 so as to inhibit the engine 102 and the motor generator 103 from being connected to each other.

10 Claims, 23 Drawing Sheets

FOREIGN PATENT DOCUMENTS

| | | |
|---|---|---|
| JP | 3-144149 A | 6/1991 |
| JP | 5-149351 A | 6/1993 |
| JP | 6-344798 A | 12/1994 |
| JP | 11-147424 A | 6/1999 |
| JP | 2000-213364 A | 8/2000 |
| JP | 2000-220556 A | 8/2000 |
| JP | 2001-107980 A | 4/2001 |
| JP | 2001-525518 A | 12/2001 |
| JP | 2002-349282 A | 12/2002 |
| JP | 2003-343403 A | 12/2003 |
| JP | 2008-57681 A | 3/2008 |
| JP | 2008-101586 A | 5/2008 |

* cited by examiner

VEHICULAR POWER TRANSMISSION APPARATUS

BACKGROUND OF THE INVENTION

1. Field of the Invention

The present invention relates to a vehicular power transmission apparatus and, more particularly, to a vehicular power transmission apparatus enabled to perform an idle stop.

2. Description of Related Art

In recent years, an idling stop vehicle configured to stop fuel supply to an engine at vehicle stop or the like to thereby stop an idling operation of an engine, and a hybrid vehicle configured to arbitrarily switch between an engine drive mode and a motor drive mode during running have become widespread. There are requests for maintaining accessories, such as an air conditioner compressor and a water pump, which operate interlockingly with rotations of a crankshaft of an engine of each of the idling stop vehicle and the hybrid vehicle, in operating states even when the engine is stopped.

Thus, hitherto, there has been proposed a vehicular power transmission apparatus configured such that when accessories are driven while an engine is stopped, the crankshaft of the engine is separated from a transmission member for transmitting rotations among the crankshaft of the engine, the rotating shaft of a motor generator, and the rotating shafts of accessories (see, e.g., Japanese Patent Unexamined Publication No. JP-A-11-147424).

As illustrated in FIG. 25, a vehicular power transmission apparatus disclosed in JP-A-11-147424 has an engine 1, a transmission 2, and a motor generator 3 functioning as both of a motor and a generator. The crankshaft of the engine 1 and the rotating shaft of the motor generator 3 are connected to each other via a belt 10 and pulleys 11 and 12. Further, the motor generator 3 is connected to a battery 6 via an inverter 7. The inverter 7 adjusts electric power supplied from the battery 6 to the motor generator 3 and drives the motor generator 3 such that the number of revolutions of the motor generator 3 is variable.

The vehicular power transmission apparatus of the above configuration drives the motor generator 3 to start the engine 1 and causes the motor generator 3 to function as a generator after the engine 1 is started. The inverter 7 charges electric power generated by the motor generator 3 to the battery 6. Incidentally, an operation of the inverter 7 is controlled by a controller 9.

The rotating shafts of an air conditioner compressor 4 and a power steering oil pump 5 are connected to the crankshaft of the engine 1 and the rotating shaft of the motor generator 3 via the belt 10 and the pulleys 13 and 14. The compressor 4 and the oil pump 5 are driven by the engine 1 when the engine 1 is operated. However, the compressor 4 and the oil pump 5 are driven by the motor generator 3 when the engine 1 is stopped.

Further, an electromagnetic clutch 8 is interposed between the crankshaft of the engine I and the pulley 11. The engagement or disengagement of the electromagnetic clutch 8 is controlled by a controller 9. When the compressor 4 and the oil pump 5 are driven by the motor generator 3 while the engine 1 is stopped, the electromagnetic clutch 8 is disengaged, so that the crankshaft of the engine 1 is separated from the belt 10.

A clutch for disengaging the crankshaft of the engine from the transmission member which transmits rotations among the crankshaft of the engine, the rotating shaft of the motor generator and the rotating shaft of the accessories in the vehicular power transmission apparatus disclosed in the JP-A-11-147424 is required to meet at least the following operating conditions (1) to (4).

(1) When the engine is started by the motor generator, the clutch engages the crankshaft of the engine with the above transmission member.

(2) When the motor generator and the accessories are driven by the engine while the engine is operated, the clutch engages the crankshaft of the engine with the above transmission member.

(3) When the engine is stopped, the clutch engages the crankshaft of the engine with the above transmission member.

(4) When the accessories are driven by the motor generator while the engine is stopped, the clutch disengages the crankshaft of the engine from the above transmission member.

Incidentally, the operating condition (3) is set for stopping the engine using the motor generator and the accessories as a load in order to instantly stop the engine and to enable the vehicle to pass the resonance point thereof quickly when the engine is stopped.

According to the operating conditions (1) to (3), a drive element and a driven element selected from the engine and the motor generator are arbitrarily interchanged therebetween. Thus, the clutch is required to be able to connect therebetween regardless of whichever of the engine and the motor generator is the drive element. Further, according to the operating condition (4), the clutch is required to be able to disengage the engine and the motor generator at least in a rotational direction in which the motor generator is the drive element.

An electromagnetic clutch has relatively high degree of design freedom regarding the setting of engagement or disengagement. Thus, the electromagnetic clutch relatively easily meets the operating conditions (1) to (4). However, the electromagnetic clutch needs a controller for controlling thereof, and an electric actuator. In a case where the electromagnetic clutch includes such a controller and the electric actuator, the size of the electromagnetic clutch is increased. In addition, the cost thereof is increased. More specifically, the limitation of space of an engine room is high. Thus, a clutch of a large size is disadvantageous in mounting thereof in the engine room.

SUMMARY OF THE INVENTION

The invention is accomplished in view of the above problems. An object of the invention is to provide a vehicular power transmission apparatus enabled to drive, when an engine is stopped, accessories by a motor generator with a simple configuration.

To achieve the foregoing object, according to the invention, there is provided a vehicular power transmission apparatus (e.g., a vehicular power transmission apparatus 100 of an embodiment) includes:

an engine (e.g., an engine 102 according to the embodiment);

a crank pulley (e.g., a crank pulley 121 of the embodiment) connected to a crankshaft (e.g., a crankshaft 109 of the embodiment) of the engine;

a motor generator (e.g., a motor generator 103 of the embodiment);

a motor generator pulley (e.g., a motor generator pulley 122 of the embodiment) including:

a first pulley (e.g., a crank connecting pulley 123 of the embodiment) connected to an input/output shaft (e.g. an input/output shaft 110 of the embodiment) of the motor generator relatively rotatably therewith; and a second pulley (e.g., a pulley 124 of the embodiment) connected directly to the input/output shaft of the motor generator, wherein the first and second pulley are connected to and provided coaxially with the input/output shaft of the motor generator;

accessory (e.g., a water pump 111 and/or a air conditioner compressor 112 of the embodiment);

an accessory pulley (e.g., a water pump driving pulley 126 and/or an air conditioner driving pulley 127) connected to an input shaft (e.g., an input shaft 117 of the water pump 111 and/or an input shaft 118 of the air conditioner compressor 112 of the embodiment) of the accessory;

a first power transmission unit (e.g., a first power transmission unit 104A of the embodiment) adapted to transmit power by laying a first transmission member (e.g., an engine belt 130 of the embodiment) at least around the crank pulley and the first pulley; and a second power transmission unit (e.g., a second power transmission unit 104B of the embodiment) adapted to transmit power by laying a second transmission member (e.g., an accessory belt 131 of the embodiment) at least around the second pulley and the accessory pulley;

a mechanical clutch (e.g., a mechanical clutch 105 of the embodiment) adapted to engage or disengage the first pulley and the second pulley; and a switching unit (e.g., a switching unit 132 of the embodiment) adapted to switch the mechanical clutch so as to inhibit an engagement therebetween when at least one of the first pulley and the second pulley is a drive element, wherein the mechanical clutch and the switching unit are provided in the motor generator pulley.

According to the vehicular power transmission apparatus of the invention, the first pulley and the second pulley are connected to each other by the mechanical clutch without using an electromagnetic clutch. Thus, the engine can be started by the motor generator. After the engine is started, the relationship between the composing element serving as the drive element and that serving as the driven element is reversed. Consequently, the motor generator generates electric power. During an idle stop, the connection between the first pulley and the second pulley is inhibited by the switching unit. Thus, the configuration, according to which only the accessories are driven, similarly to the case using the electromagnetic clutch, can be achieved. In addition, because the mechanical clutch can be accommodated in the pulley, the size of the apparatus can be reduced.

According to another aspect of the invention, it is adaptable that the second pulley includes an extension portion (e.g., an extension portion 124b of the embodiment) which axially extends towards the first pulley, the extension portion includes a plurality of cam surfaces (e.g., a cam surface 141 of the embodiment), a cavity is defined between an inner circumferential surface (e.g., an inner circumferential surface 145 of the embodiment) of the first pulley and the extension portion of the second pulley, a cage (e.g., a cage 151 of the embodiment) is disposed between the cam surface and the inner circumferential surface of the pulley for holding each rolling element (e.g., a rolling element 150 of the embodiment), and the mechanical clutch includes the cam surface, the inner circumferential surface of the first pulley, and the cage.

According to the vehicular power transmission apparatus of the invention, the mechanical clutch is constituted by, e.g. a roller clutch. Thus, the apparatus of the invention can be simplified.

According to still another aspect of the invention, it is adaptable that the switching unit includes:

a first groove (a groove 142) formed on at least a part of the extension portion so as to extend in axial direction;

a second groove (a groove 152) formed on a part of the cage at a portion corresponding to the first groove so as to extend in the axial direction;

a claw (e.g., claws 170 of the embodiment) movable between the first and second grooves, and the claw is adapted to be inserted between the first and second grooves so as to fix a position of the cage.

According to the vehicular power transmission apparatus of the invention, the switching unit is constituted by the axially movable claws and grooves formed by machining parts of the cam surface and cage. Thus, the apparatus of the invention can be simplified without requiring another mechanical clutch.

According to still another aspect of the invention, it is adaptable that the switching unit inhibits the engagement between the first pulley and the second pulley by fixing the position of the cage such that each of the rolling elements is placed at a radially midpoint position (e.g., a midpoint position 141c of the embodiment) of the cam surface.

According to the vehicular power transmission apparatus of the invention, the engagement between the first pulley and the second pulley can be inhibited in the mechanical clutch by a simple configuration.

According to still another aspect of the invention, it is adaptable that the switching unit inhibits the engagement between the first pulley and the second pulley when the claw fixes the position of the cage such that each of the rolling elements is placed at a position (e.g., each of end portions 141a and 141b of the embodiment) shifted towards one direction from a radially midpoint position of the cam surface, and one of the first pulley and the second pulley serves as a drive element.

According to the vehicular power transmission apparatus of the invention, with a simple configuration, the engagement between the drive element and the driven element can be inhibited only when one of the first pulley and the second pulley in the mechanical clutch serves as a drive element. Even in a case where the switching unit fails in a state in which the engagement of only one of the first pulley and the second pulley to the driven element is inhibited, the other of the first pulley and the second pulley is engaged to the driven element. Thus, electric power can be generated by using the motor generator.

According to still another aspect of the invention, it is adaptable that guide inclined surfaces (e.g., a guide inclined surface 154 of the embodiment) for guiding insertion of the claw are respectively provided at both ends in a circumferential direction of the second groove, and tilted surfaces (e.g., a tilted surface 171 of the embodiment) respectively corresponding to the guide inclined surfaces are provided at both circumferential sides a tip end portion of the claw respectively.

According to the vehicular power transmission apparatus of the invention, the guide inclined surface is provided in each of the second grooves. In addition, the tilted surface is provided on the claw. Thus, the claw can easily be introduced into the second grooves of the cage. Consequently, the pulleys can easily be engaged or disengaged from each other.

According to still another aspect of the invention, it is adaptable that an insertion unit (an actuator 180 of the embodiment) which inserts the claw into the second groove of the cage is provided on the input/output shaft of the motor generator.

According to the vehicular power transmission apparatus of the invention, the insertion unit is disposed on the input/output shaft of the motor generator. Thus, the first and second pulleys can be engaged or disengaged from each other without increasing the diameters of the first and second pulleys.

According to still another aspect of the invention, it is adaptable that the first pulley is axially supported on the second pulley by two bearings (e.g., bearings 135 and 136 of the embodiment) provided at an end part of the extension portion and a base portion of the second pulley, respectively, and the first pulley radially laps over at least a part of the second pulley.

According to the eighth vehicular power transmission apparatus of the invention, a part of the first pulley enters the second pulley and is axially supported on the second pulley. Thus, the two pulleys can surely be held.

According to still another aspect of the invention, it is adaptable that the vehicular power transmission apparatus further includes:

an idle pulley (e.g., an idle pulley 125 of the embodiment) and a tensioner pulley (e.g., a tensioner pulley 128 of the embodiment), which are configured to add a tensional force to the first transmission member from an outer circumferential side of the first transmission member, and the idle pulley is disposed coaxially with the accessory pulley and relatively rotatably therewith, and that the tensioner pulley is provided at a side opposite to the accessory pulley with respect to the first transmission member.

According to the ninth vehicular power transmission apparatus of the invention, a tensional force can be added by the idle pulley and the tensioner pulley to the first transmission member from the outer circumferential side of the first transmission member. Thus, the length of the first transmission member can be minimized. In addition, the idle pulley is disposed coaxially with the accessory pulley by shifting the axial position of the idle pulley. Consequently, the input shaft of the accessory can be used as the rotating shaft of the idle pulley by preventing the idle pulley and the accessory pulley from interfering with each other.

According to still another aspect of the invention, it is adaptable that the accessory pulley has an extension portion (e.g., an extension portion 126b of the embodiment) which extends towards an end portion of an input shaft of the accessory, and the idle pulley is supported on the extension portion of the accessory pulley via a bearing (e.g., a bearing 137 of the embodiment).

According to the tenth vehicular power transmission apparatus of the invention, the idle pulley is supported on the extension portion of the accessory pulley via the bearing. Thus, the accessory pulley and the idle pulley can perform relative rotation with a simple configuration.

According to still another aspect of the invention, it is adaptable that the first pulley and the second pulley have a substantially same diameter, and that the accessory pulley and the idle pulley have a substantially same diameter.

According to the eleventh vehicular power transmission apparatus of the invention, when the engagement of the mechanical clutch is performed so that the first pulley and the second pulley can rotate integrally, the accessory pulley and the idle pulley rotate in the same direction. Thus, in a case where the first pulley and second pulley, and the accessory pulley and the idle pulley have the same diameter, no rotation difference is caused therebetween. Consequently, the generation of frictional resistance in the bearing provided between the accessory pulley and the idle pulley can be restrained.

DETAILED DESCRIPTION OF EXEMPLARY EMBODIMENTS OF THE PRESENT INVENTION

Hereinafter, preferred embodiments of a vehicular power transmission apparatus according to the invention are described in detail with reference to the accompanying drawings.

Figure 1:
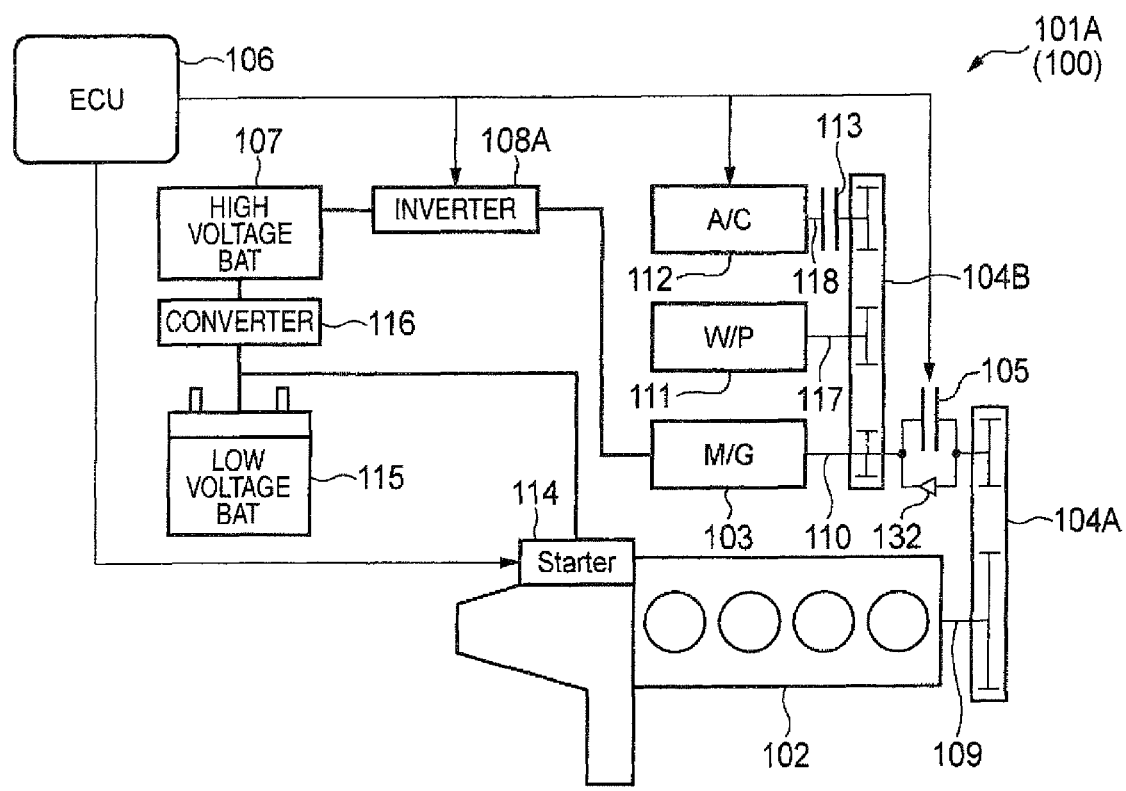
FIG. 1 is a block diagram illustrating a schematic configuration of an idling stop vehicle to which a vehicular power transmission apparatus according to the invention can be applied.

A vehicle 101A illustrated in FIG. 1, to which a vehicular power transmission apparatus according to the invention can be applied, is what is called an idling stop vehicle. The vehicle 101A includes an engine 102, a motor generator 103, a first power transmission unit 104A for transmitting rotations between a crankshaft 109 of the engine 102 and an input/output shaft 110 of the motor generator 103, a water pump 111 and an air conditioner compressor 112 which serve as accessories, a second power transmission unit 104B for transmitting rotations between the input/output shaft 110 of the motor generator 103 and the input shaft of each of the accessories (an input shaft 117 of the water pump 111 and an input shaft 118 of the air conditioner compressor 112), a mechanical clutch 105 interposed between the first power transmission unit 104A and the second power transmission unit 104B, a switching unit 132 for switching the clutch, and an ECU 106 (corresponding to the control unit) for controlling an operation of the motor generator 103.

Figure 2:
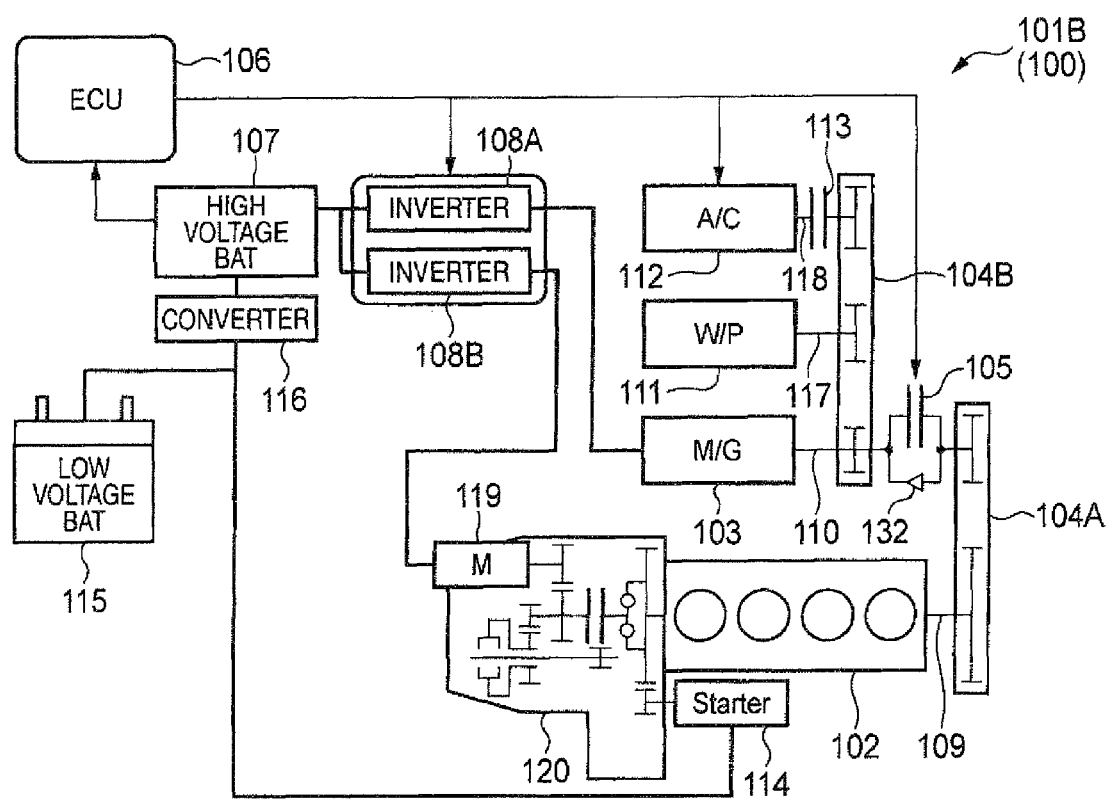
FIG. 2 is a block diagram illustrating a schematic configuration of a hybrid vehicle to which a vehicular power transmission apparatus according to the invention can be applied.

Further, another vehicle 101B illustrated in FIG. 2, to which the vehicular power transmission apparatus according to the invention, is what is called a hybrid vehicle. Incidentally, parts of the vehicle 10B, which are the same as those of the idling stop vehicle 101A, are designated by the same or corresponding reference numerals used to designate the parts of the vehicle 101A.

The hybrid vehicle 101B illustrated in FIG. 2 includes an engine 102, a motor 119 capable of assisting the engine 102, a reduction gear including a mechanical clutch performing engagement/disengagement of the engine 102 and the motor 119, a motor generator 103, a first power transmission unit 104A for transmitting rotations between a crankshaft 109 of the engine 102 and an input/output shaft 110 of the motor generator 103, a water pump 111 and an air conditioner compressor 112 which serve as accessories, a second power transmission unit 104B for transmitting rotations between an input/output shaft 110 of the motor generator 103 and each of input shafts of the accessories (an input shaft 117 of the water pump 111 and an input shaft 118 of the air conditioner compressor 112), a mechanical clutch 105 interposed between the first power transmission unit 104A and the second power transmission unit 104B, and a switching unit 132 for switching the clutch, an ECU 106 (corresponding to the control unit) for controlling operations of the motor 119 and the motor generator 103. Incidentally, in the hybrid vehicle 101B, the motor 119 is driven by being supplied with electric power from a high-voltage battery 107 via an inverter 108B. Further, the input/output shaft 110 is rotated by power of the engine 102, so that electric power can be generated. Electric power generated by the motor 119 is charged into the high-voltage battery 107 via the inverter 108B.

Hereinafter, vehicular power transmission apparatuses according to the invention, which can be applied to the idling stop vehicle 101A and the hybrid vehicle 101B are described as vehicular power transmission apparatuses 100. The vehicular power transmission apparatuses 100 can perform an idle stop. The vehicular power transmission apparatuses 100 includes the first power transmission unit 104A for transmitting rotations between the crankshaft 109 of the engine 102 and the input/output shaft 110 of the motor generator 103, the second power transmission unit 104B for transmitting rotations between the input/output shaft 110 of the motor generator 103 and the input shaft of each of the accessories, the mechanical clutch 105 interposed between the first power transmission unit 104A and the second power transmission unit 104B, and the switching unit 132 for switching the clutch.

The input shaft 117 of the water pump 111 is connected directly to the second power transmission unit 104B. Thus, the water pump 111 is always driven and maintained in an operating state when the engine 102 is operated, or when the motor generator 103 is driven. The compressor clutch 113 is interposed between the input shaft 118 of the air conditioner compressor 112 and the second power transmission unit 104B. The input shaft 118 of the air conditioner compressor 112 is arbitrarily engaged to the second power transmission unit 104B by controlling the engagement and the disengagement of the compressor clutch 113. Incidentally, e.g., an electromagnetic clutch can be used as the compressor clutch 113. The engagement or disengagement of the compressor clutch 113 is controlled by the ECU 106.

The ECU 106 controls switching in the inverter 108A and adjusts electric power to be supplied to the motor generator 103 to thereby drive the motor generator 103 so that the number of rotations of the motor generator 103 is variable. Then, the ECU 106 drives the motor generator 103 to start the engine 102. After the engine 102 is started, the ECU 106 causes the motor generator 103 to be driven by the engine 102. In addition, the ECU 106 causes the motor generator 103 to generate electric power. The electric power generated by the motor generator 103 is charged into the high-voltage battery 107 via the inverter 108A.

Incidentally, the vehicular power transmission apparatus 100 includes a starter motor 114. Thus, even when an amount of electric energy of the high-voltage battery 107 for supplying electric power to the motor generator 103 runs short, the engine 102 can surely be started. A low-voltage battery 115 for supplying electric power to the starter motor 114 is charged by a converter 116 connected to the high-voltage battery 107, so that the amount of electric energy of the low-voltage battery 115 is always maintained at a sufficient level.

Figure 3:
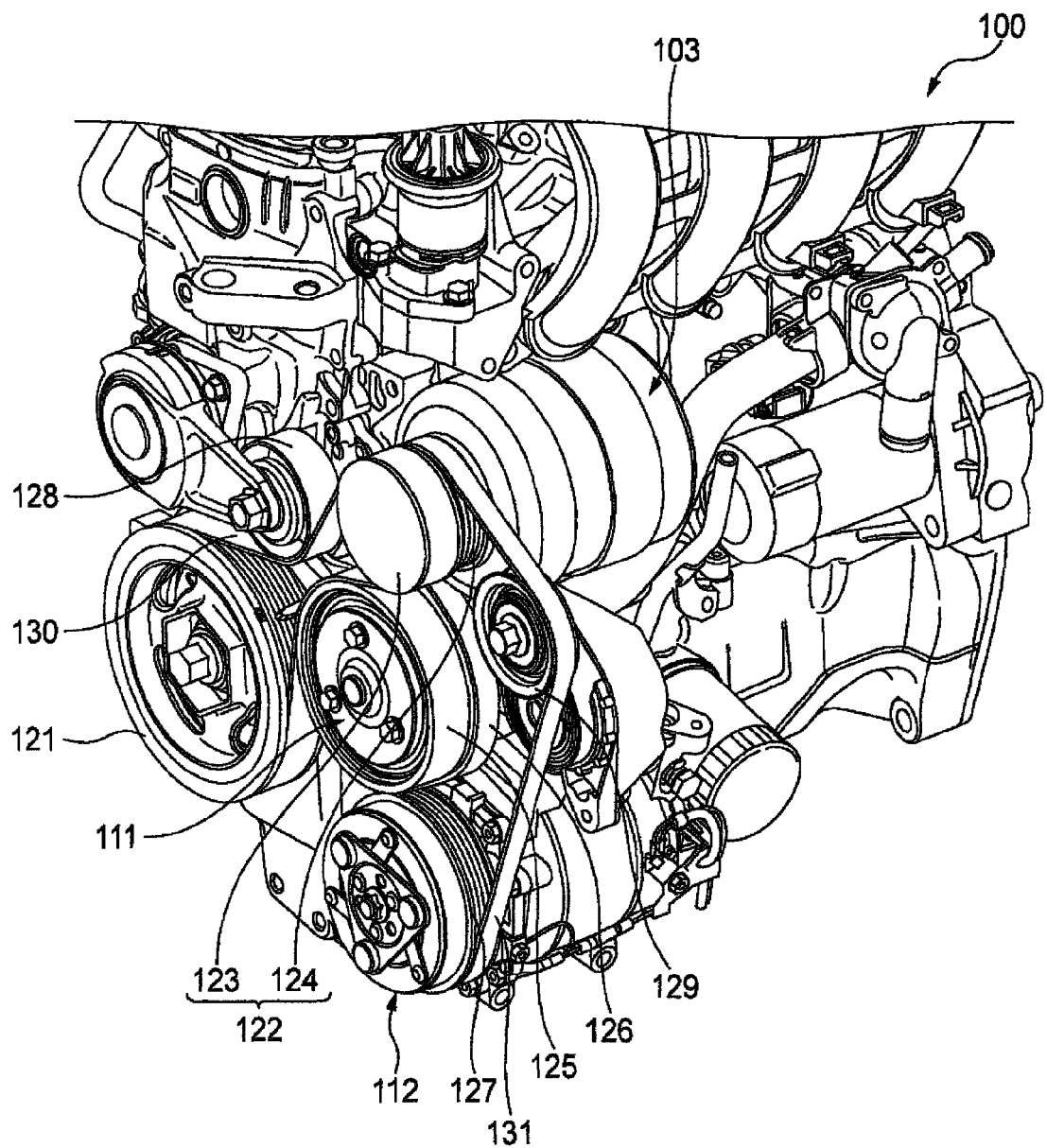
FIG. 3 is a perspective view illustrating an embodiment of the vehicular power transmission apparatus according to the invention.

As illustrated in FIG. 3, the vehicular power transmission apparatus 100 according to the invention includes a crank pulley 121 connected to the crankshaft 109 of the engine 102, the motor generator 103 placed obliquely upwardly from the engine 102, and the motor generator pulley 122 disposed on the input/output shaft 110 of the motor generator 103. The motor generator pulley 122 includes two pulleys, i.e., a crank connecting pulley 123 (corresponding to the first pulley) and an accessory pulley driving pulley 124 (corresponding to the second pulley), which are arranged in this order from an outer side of the vehicular power transmission apparatus 100 so as to be coaxial with the input/output shaft 110 of the motor generator 103. The crank connecting pulley 123 and the accessory driving pulley 124 have substantially the same diameter and are constructed relatively rotatably with each other.

The vehicular power transmission apparatus 100 is such that the engine cooling water pump 111 is disposed under the motor generator 103 and that the air conditioner compressor 112 is placed under the water pump 111. Two pulleys, i.e., an idle pulley 125 and a water pump driving pulley 126 are coaxially on an axis line of the input shaft 117 of the water pump 111 from an outer side of the vehicular power transmission apparatus 100. The air conditioner driving pulley 127 is provided on an input shaft 118 of the air conditioner compressor 112. Tensioner pulleys 128 and 129 are provided obliquely downwardly in a lateral direction of the accessory driving pulley 124.

The water pump driving pulley 126 and the idle pulley 125 have substantially the same diameter and are formed relatively rotatably with each other.

Figure 4:
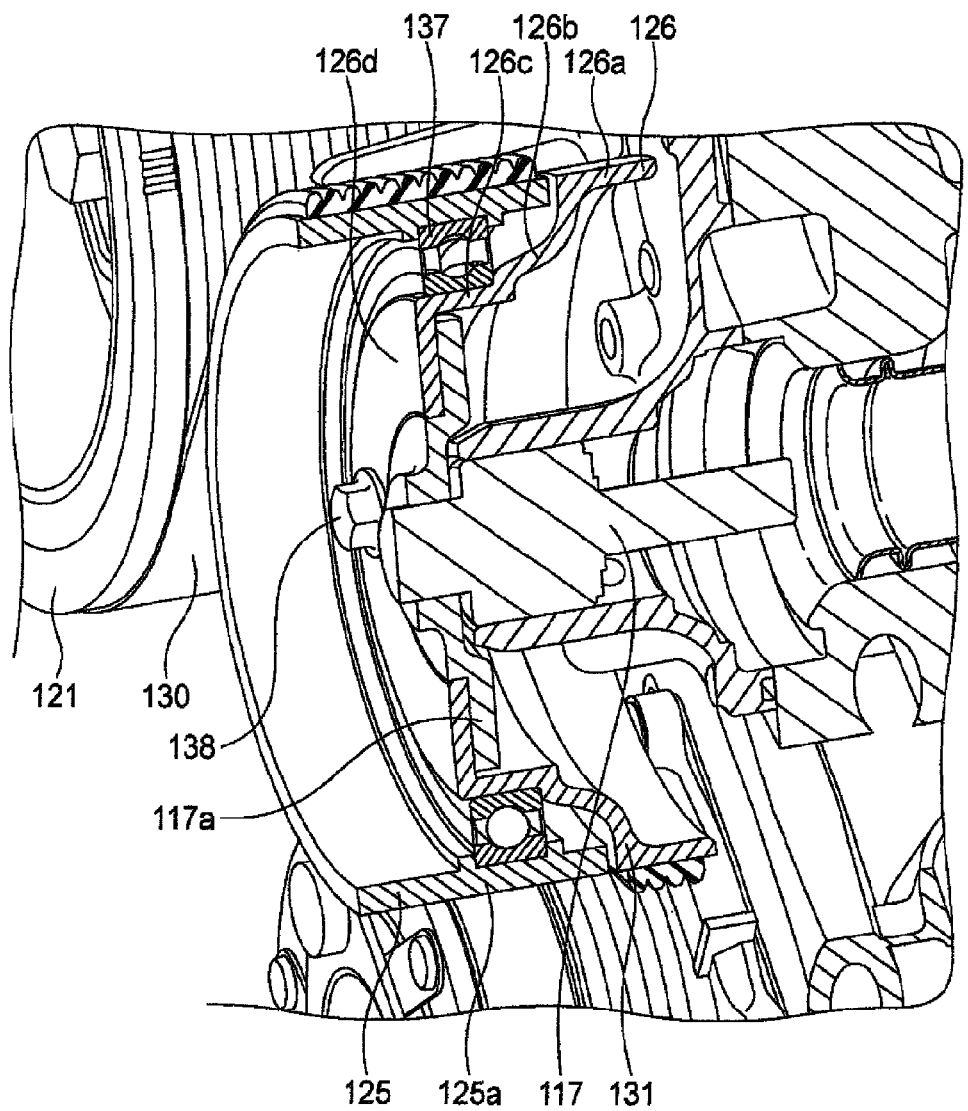
FIG. 4 is a partially cutaway perspective view illustrating a portion around an input shaft of a water pump.

More specifically, as illustrated in FIG. 4, a belt stretching surface 126a formed on an axially inner side to extend along the input shaft 117, and an extension portion 126b provided to extend from the belt stretching surface 126a so that the diameter of the extension portion is gradually reduced towards an axially outside are provided in the water pump driving pulley 126. A cylindrical bearing holding portion 126c and a disk-like connecting portion 126d are provided on the extension portion 126b.

Figure 5:
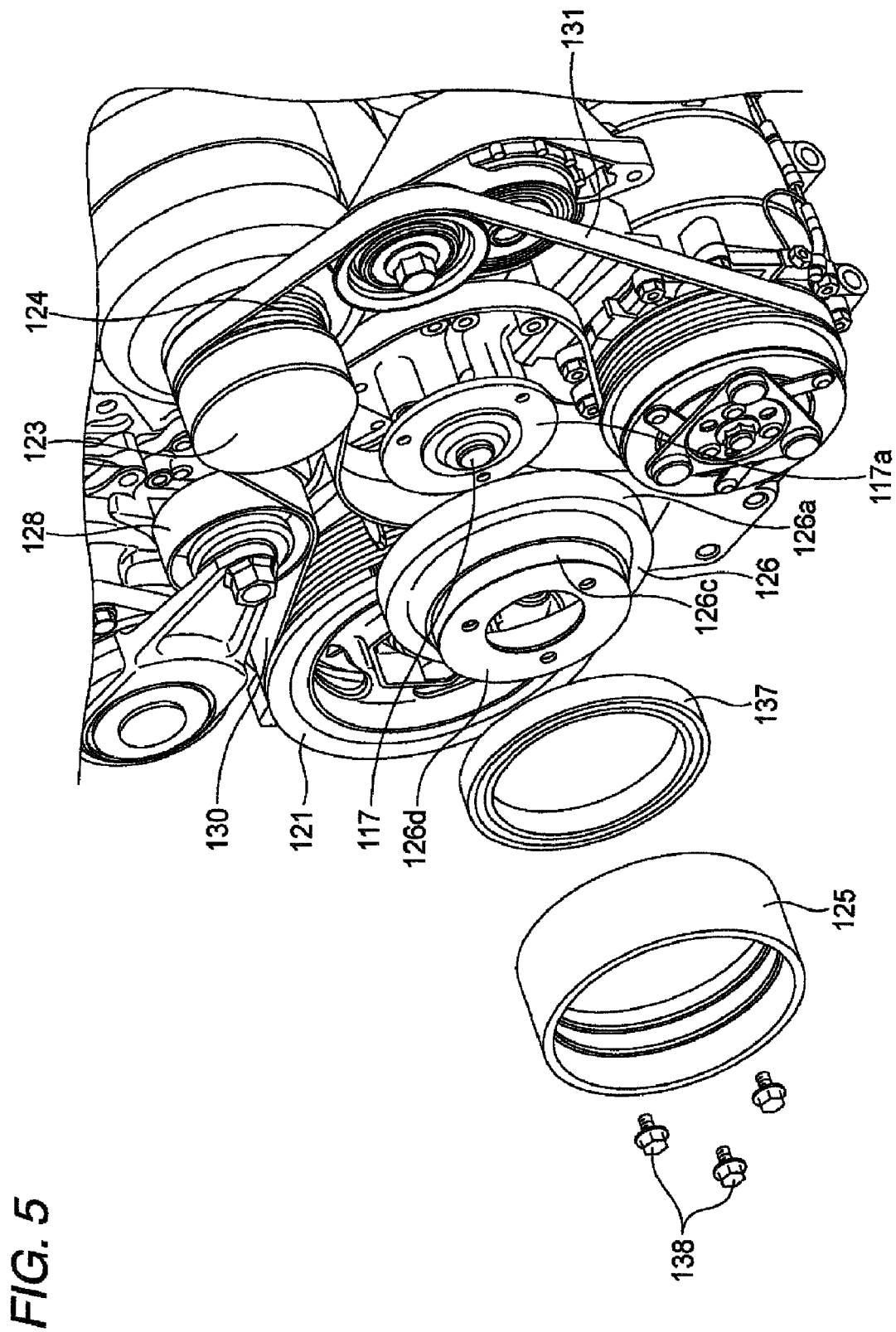
FIG. 5 is an exploded perspective view illustrating the assembly of the water pump and an accessory pulley.

The idle pulley 125 is configured such that the belt stretching surface 125a thereof is juxtaposed with the belt stretching surface 126a of the water pump driving pulley 126 on an axially outer side, that the idle pulley 125 is supported on the water pump driving pulley 126 relatively rotatably therewith via a bearing 137 fit onto the bearing holding portion 126c of the water pump driving pulley 126, and that as illustrated in FIG. 5, the connecting portion 126d of the water pump driving pulley 126 is fixed to a disk portion 117a provided at an axial end of the input shaft 117 of the water pump 171 by a bolt 138, and that the bearing 137 is fit into between the water pump driving pulley 126 and the idle pulley 125. As illustrated in FIGS. 4 and 5, the idle pulley 125 is formed integrally with an outer ring of the bearing 137.

However, the idle pulley according to the invention is not limited thereto. The idle pulley 125 can be formed to be separated from the bearing 137. Further, the idle pulley 125 having a projection provided only on an axially outward side of the inner circumferential surface thereof can be constructed by being press-fit onto the bearing holding portion 126c of the water pump driving pulley 126 in a state in which the bearing 137 is mounted in the idle pulley 125.

In the vehicular power transmission apparatus 100 configured in this manner, an engine belt 130 (corresponding to the first transmission member) is laid around the crank pulley 121 and the crank connecting pulley 123. A tensional force is added to the engine belt 130 by the tensioner pulley 128 and the idle pulley 125 respectively provided on opposite sides from the outer circumferential side of the engine belt 130. Thus, the first power transmission unit 104A is constructed, by which power can be transmitted between the crank pulley 121 and the crank connecting pulley 123. On the other hand, the accessory belt 131 (corresponding to the second transmission member) is laid around the accessory driving pulley 124, the water pump driving pulley 126, and the air conditioner driving pulley 127. A tensile force is added from the inner circumferential side of the accessory belt 131 thereto. Thus, the second power transmission unit 104B is constructed such that a tensional force is added by the tensioner pulley 129 from the inner circumferential side of the accessory belt 131 thereto and that the motor generator driving unit can transmit power from the accessory driving pulley 124 to the water pump driving pulley 126 and the air conditioner driving pulley 127. Incidentally, the direction of rotation of the crank pulley 121 is the same as that of normal rotation of the motor generator 103 and is set to be clockwise, as viewed from the direction in which FIG. 3 is taken.

In the above configuration, the drive element and the driven element are arbitrarily exchanged between the engine 102 and the motor generator 103. Then, the mechanical clutch 105 interposed between the first power transmission unit 104A and the second power transmission unit 104B is constructed to be able to transmit power even when the engine 102 and the motor generator 103 are selected as the drive element and the driven element, respectively, and vice versa. The mechanical clutch 105 is provided in the motor generator pulley 122. Further, in the mechanical clutch 105, in order to inhibit the engagement between the drive element and the driven element when one of the engine 102 (or the crank connecting pulley 123) and the motor generator 103 (or the accessory driving pulley 124) is used as the drive element, a switching unit 132 for arbitrarily switching the mechanical clutch 105, as occasion demands, the mechanical clutch 105 is provided inside the motor generator pulley 122.

The motor generator 103 is driven using the mechanical clutch 105 to thereby cause the engine 102 to be driven. Thus, the cranking and ignition of the engine 102 can be performed. Alternatively, the engine 102 is driven by using the mechanical clutch 105 to thereby cause the motor generator 103 to be driven. Consequently, the motor generator 103 is caused by power of the engine 102 to generate electric power. Further, the accessories can be driven by the driving force of the engine 102. In addition, the power transmission by the crank connecting pulley 123 and the accessory driving pulley 124 are controlled by the switching unit 132 so as not to be performed. Thus, the accessories can be driven by the motor generator 103, independent of the engine 102.

Hereinafter, the mechanical clutch 105 and the switching unit 132 are described in detail.

Figure 6:
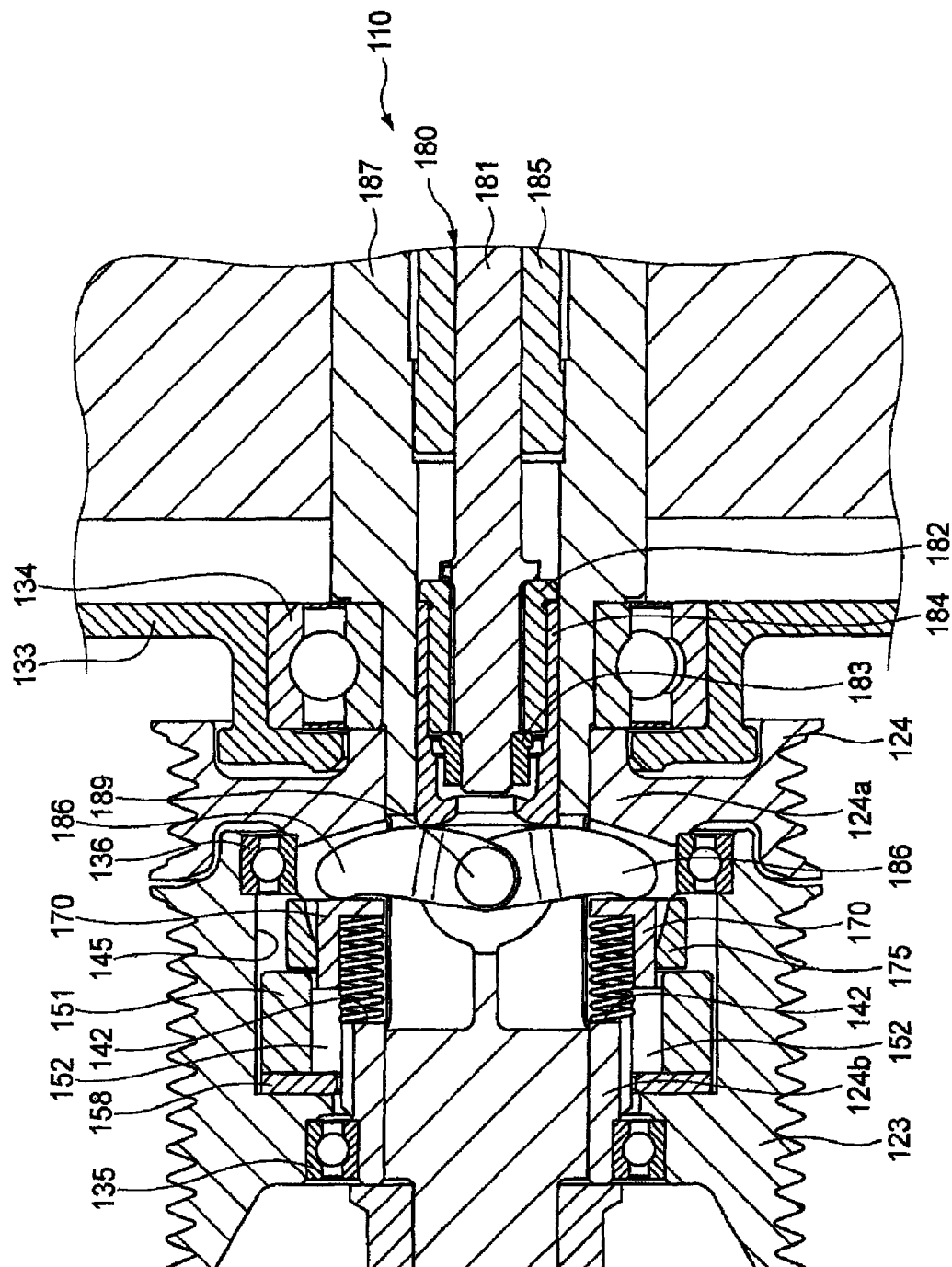
FIG. 6 is a cross-sectional view illustrating the entire configuration of a mechanical clutch.

As illustrated in FIG. 6, in the input/output shaft 110 of the motor generator, a shaft 187 incorporating the actuator 180 to be described below is supported on the bearing 134 rotatably with respect to the motor/housing 133. The accessory driving pulley 124 is attached to the input/output shaft 110 of the motor generator 103 integrally rotatably therewith. The cylindrical extension portion 124b extended from a base portion 124a of the accessory driving pulley 124 towards the crank connecting pulley 123 is provided so as to surround the outer circumference of the input/output shaft 110.

The crank connecting pulley 123 is provided so as to partly lap over the outer side of the extension portion 124b of the accessory driving pulley 124. The inner circumferential surface of the crank connecting pulley 123 is formed so as to be dented to thereby form a cylindrical cavity between the inner circumferential surface of the crank connecting pulley 123 and the extension portion 124b. Further, the crank connecting pulley 123 is supported on a bearing 135 provided at an end of the extension portion 124b and a bearing 136 provided at an end portion of the cavity, which is located at the side of the accessory driving pulley 124 and at the side of the base portion 124a of the accessory driving pulley 124, relatively rotatably with respect to the accessory driving pulley 124.

Figure 12:
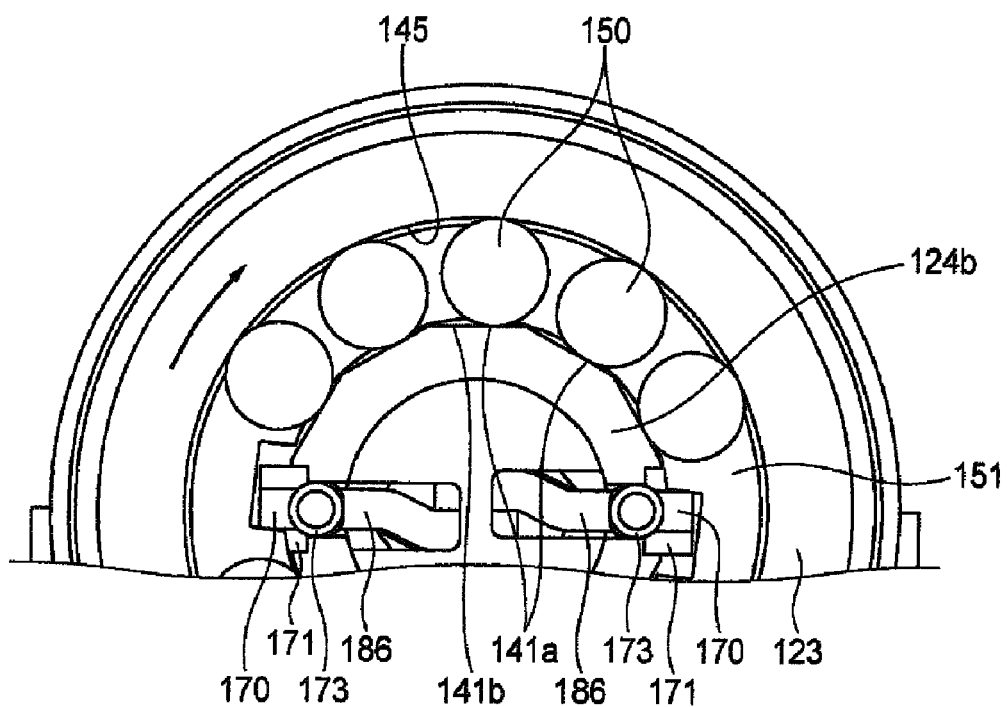
FIG. 12 is a cross-sectional view illustrating a radially primary part of the mechanical clutch at switching off (clutch engagement)

A plurality of cam surfaces 141 are formed on the extension portion 124b so as to be arranged in the circumferential direction thereof. Each of the cam surfaces 141 is formed into a flat shape in radial cross-sectional view (see FIGS. 8, 12, and 15). The cage 151 having a plurality of rolling elements 150 is provided in the cavity formed between the extension portion 124b and the crank connecting pulley 123. The cage 151 holds the rolling elements 150 between each cam surface 141 and the inner circumferential surface 145 of the crank connecting pulley 123 (see FIGS. 12 and 15). When each rolling element 150 is placed on one of end portions of the cam surface 141, as illustrated in FIG. 12, each rolling element 150 is bitten and held between the annular inner circumferential surface 145 and the cam surface 141. Thus, the mechanical clutch 105 is constructed to be a two-way clutch which can transmit power even when the crank connecting pulley 123 serves as the drive element, whereas the accessory driving pulley 124 serves as the driven element, or even when the accessory driving pulley 124 serves as the drive element, whereas the crank connecting pulley 123 serves as the driven element.

Two grooves 142 are axisymmetrically formed between the cam surfaces 141, 141 of two extension portion 124b of the accessory driving pulley 124. Two grooves 152 are provided in an inner cylindrical portion of the cage 151, which respectively correspond to two grooves 142 formed in the extension portion 124b of the accessory driving pulley 124. Claws 170 are provided in the grooves 142 of the extension portion 124b axially movably. Guide inclined surfaces 154 are formed on both circumferential sides of each groove 152 of the cage 151 by being cutout so as to be inclined at an angle of 45° to a radial direction. Tilted surfaces 171 are formed on both sides of an end portion of each claw 170, which is provided at the side of the cage 151, by being cutout so as to be inclined at an angle of 45° to a radial direction. Thus, the claws 170 moving the groove 142 of the extension portion 124b are constructed to facilitate the insertion of the claws 170 into the grooves 152 of the cage 151 by causing the tilted surfaces 171 of the claws 170 to abut against the guide inclined surfaces 154 of the cage 151, respectively.

Figure 10:
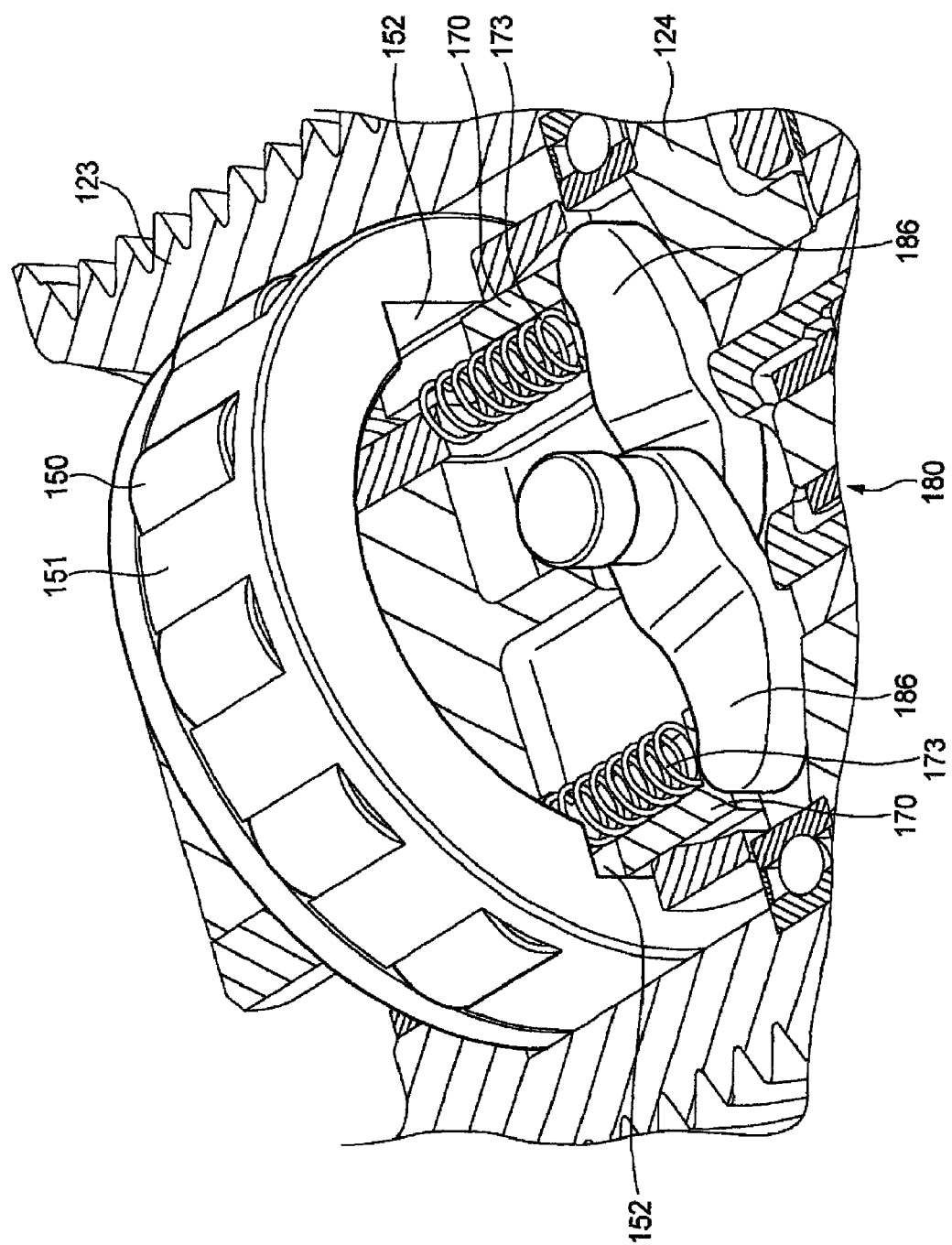
FIG. 10 is a perspective view illustrating a primary part of the mechanical clutch at switching off (clutch engagement)
Figure 13:
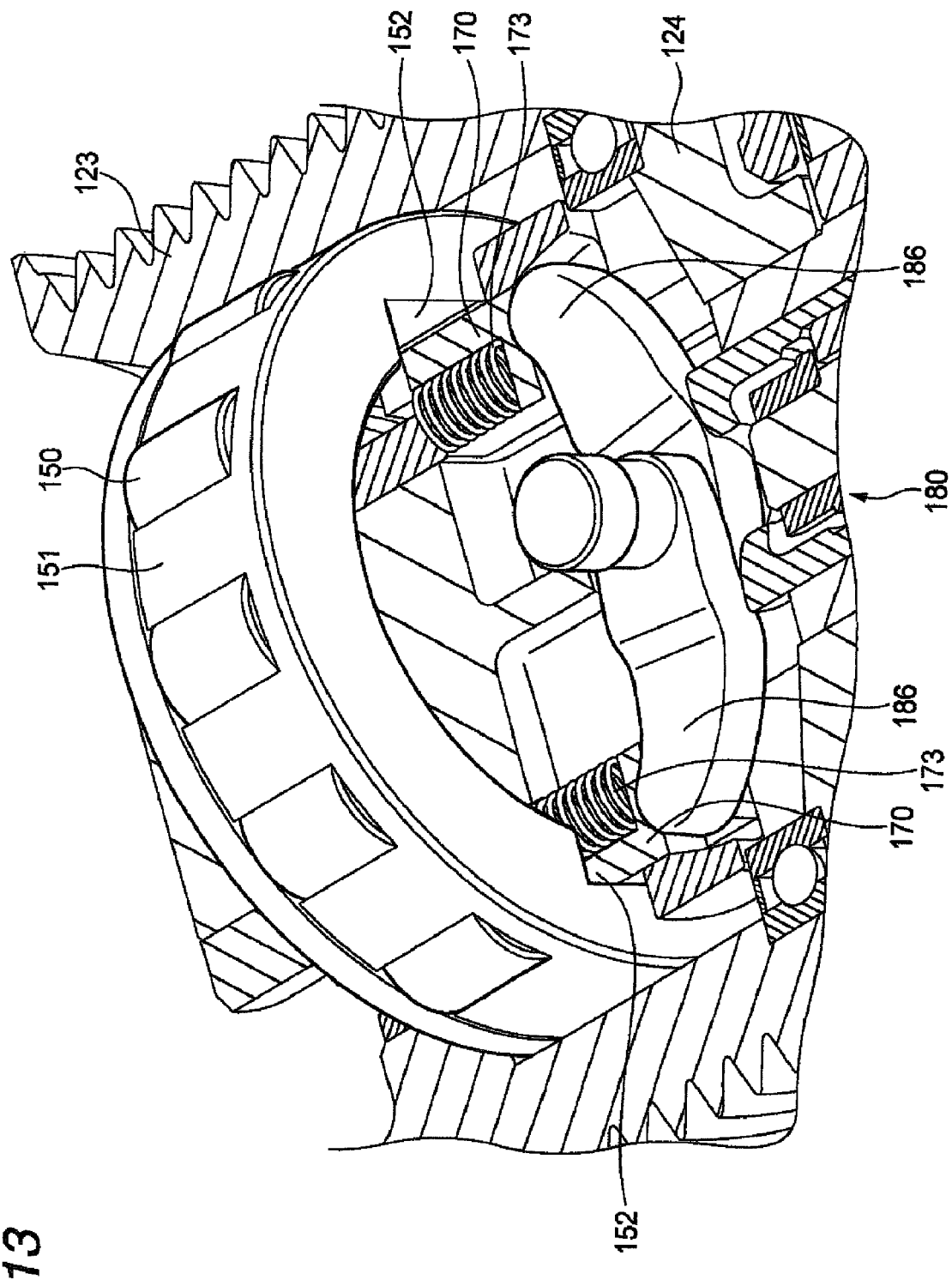
FIG. 13 is a perspective view illustrating a primary part of the mechanical clutch at switching on (clutch disengagement)

The cage 151 holds a plurality of rolling elements 150 in its pockets 156 (see FIGS. 10 and 13). A friction plate 158 for absorbing the rotation difference between the crank connecting pulley 123 and the accessory driving pulley 124 is mounted between the cage 151 and the crank connecting pulley 123. Further, the grooves 142 of the accessory driving pulley 124 are such that the claws 170 are urged by a spring 173 in a direction opposite to the cage 151, and that a guide 175 for preventing the claws 170 from being slipped off is provided adjacent to the bearing 136.

When the claws 170 are inserted into the grooves 152 of the cage 151, the cage 151 and the extension portion 124b are integrated by the claws 170. At that time, the position of the cage 151 is fixed to thereby determine the position of each of the rolling elements 150 on the cam surface 141. In a first embodiment to be described below, the claws 170 fix the position of the cage 151 such that each rolling element 150 is situated at a midpoint of an associated one of the cam surfaces 141. Whichever of the crank connecting pulley 123 and the accessory driving pulley 124 serves as the drive element, the clutch disengagement state for inhibiting the crank connecting pulley 123 and the accessory driving pulley 124 from being engaged to each other is achieved. According to a second embodiment to be described below, the claws 170 fix the position of the cage 151 such that each rolling element 150 is shifted to one side of an associated one of the cam surfaces 141 from a midpoint position thereof. Consequently, a one-way clutch is implemented, which inhibits the engagement between the crank connecting pulley 123 and the accessory driving pulley 124 only when the accessory driving pulley 124 serves as the drive element.

The input/output shaft 110 of the motor generator 103 includes an actuator 180 (corresponding to the insertion unit) for axially moving the claws 170, which is provided therein. The switching unit 132 is constructed by inserting the claws 170 into the grooves 152 of the cage 151 using the actuator 180. As illustrated in FIG. 6, a rod holder 182 is fixed to an end portion of a rod 181 with a rod nut 183. A piston 184 is fit onto the outer side of the rod holder 182. An inner tube 185 is attached to a part of the rod 181, which is located at the side of the motor generator 103. Levers 186 are attached to the input/output shaft 110 of the motor generator 103 by a lever pin 189 thereof and are supported rotatably around the lever pin 189. The switching unit 132 constructed in this manner is such that the actuator 180 axially moves and abuts against and pushes the levers 186 so that each lever 186 rotates around the lever pin 189 and pushes the claws 170 towards the cage 151 against an urging force of a spring 173. Consequently, the tilted surfaces of the claws 170 are guided by the guide inclined surfaces 154 of the cage 151. The claws 170 are inserted into the grooves 152. Thus, the position of the cage 151 is fixed. Incidentally, the actuator 180 can be controlled by an optional control method, e.g., a hydraulic control or an electromagnetic control.

Hereinafter, the assembly of the pulley parts and the actuator 180 of the vehicular power transmission apparatus 100 according to the invention is described with reference to FIGS. 7 to 9.

Figure 7:
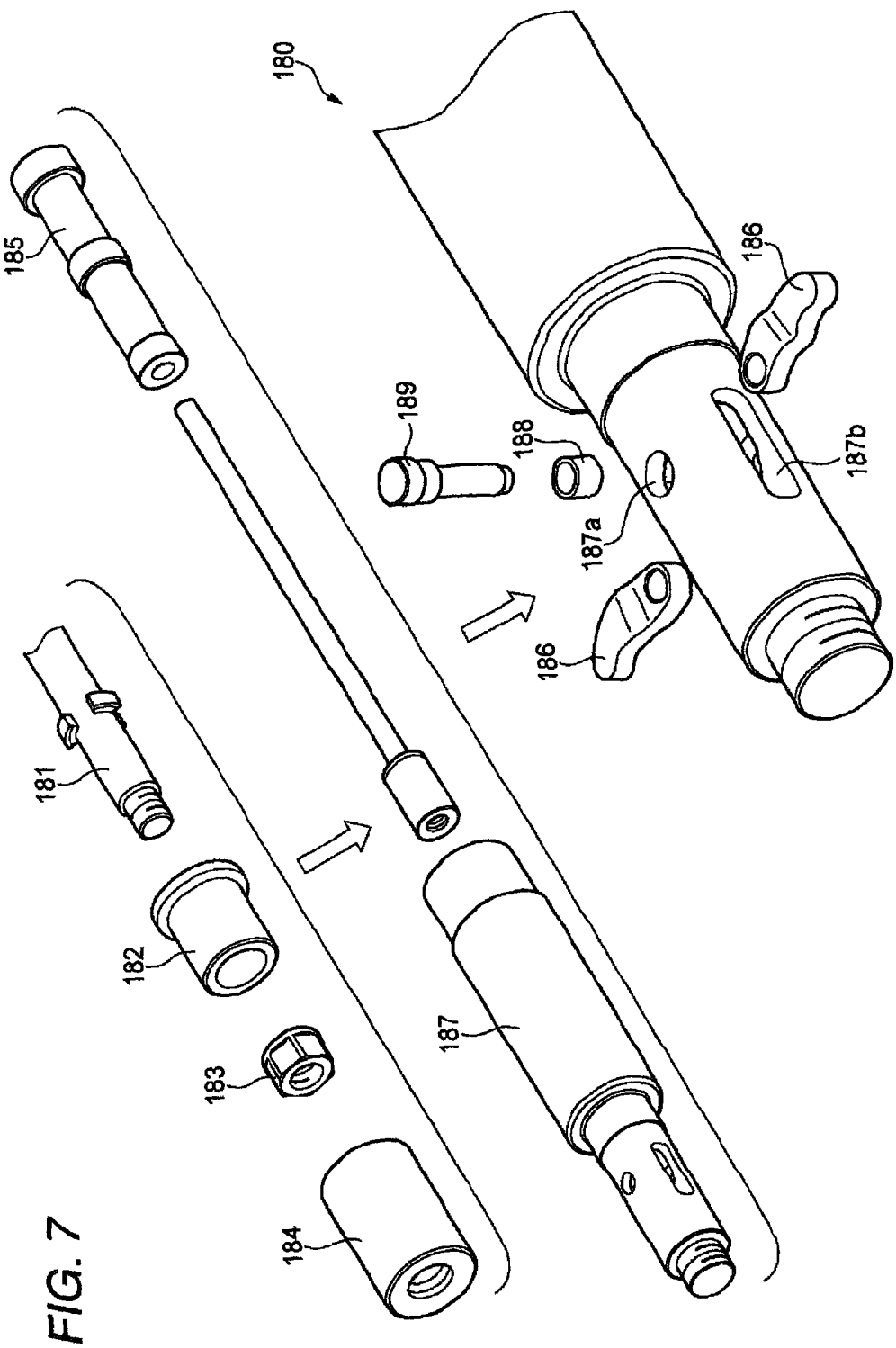
FIG. 7 is an explanatory view illustrating the configuration of composing-members of a shaft constituting the mechanical clutch.

As illustrated in FIG. 7, first, the rod holder 182 of the actuator 180 is fixed to an end portion of the rod 181 by the rod nut 183 and that the piston 184 is fit onto the outer side of the rod holder 182. A resultant part constructed in this manner is inserted into the shaft 187 constituting the input/output shaft 110 of the motor generator 103. An inner tube 185 is attached to the other end of the resultant part. Subsequently, the levers 186 are respectively inserted into the shaft 187 from the lever openings 187b. The levers 186, 186 are coaxially arranged in an up-down direction by placing a lever collar 188 downwardly, as viewed in FIG. 7. Then, the lever pin 189 is inserted into a pin opening 187a formed in an upper part of the shaft 187.

Figure 8:
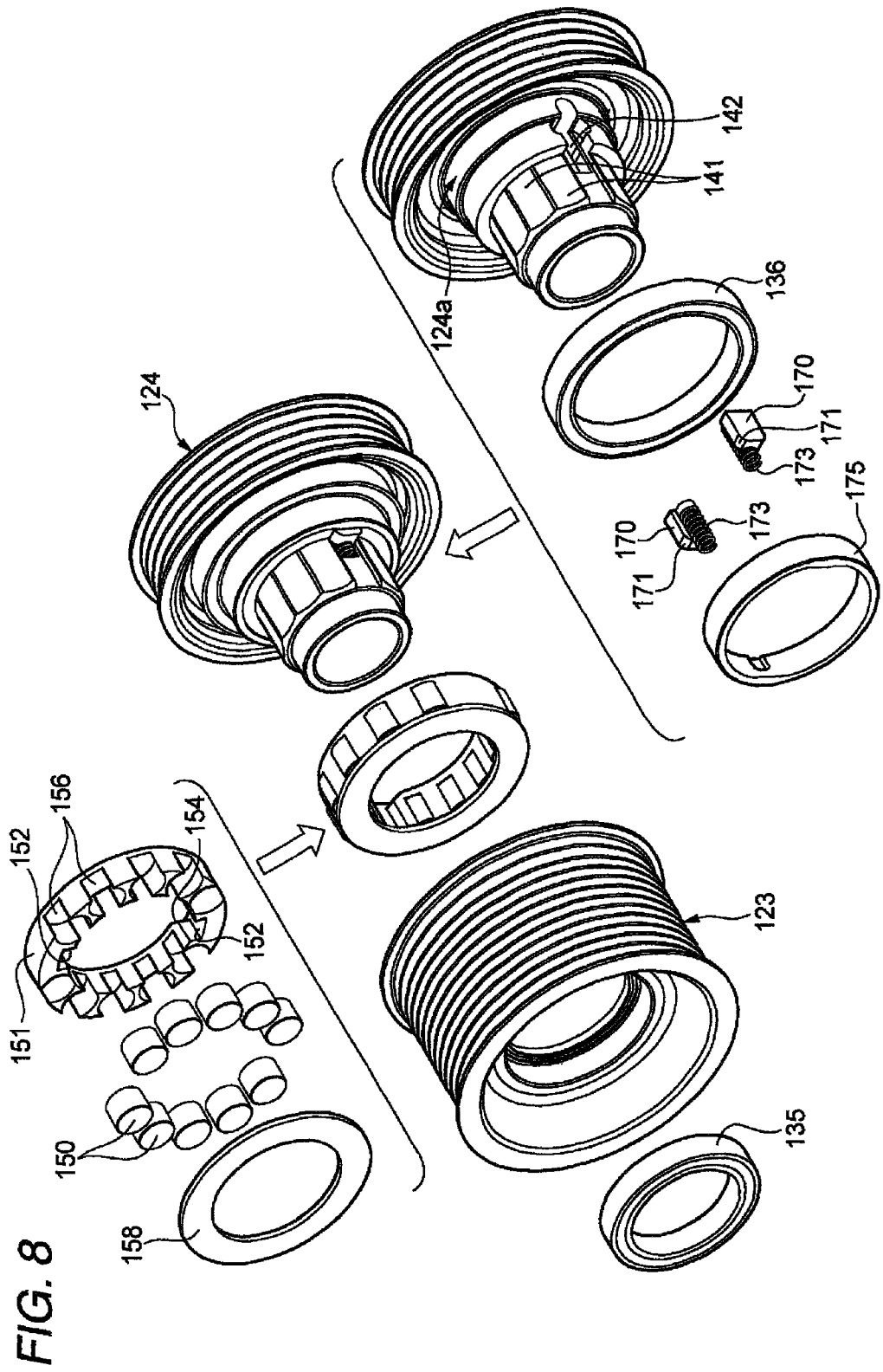
FIG. 8 is an explanatory view illustrating the configuration of composing-members of a pulley constituting the mechanical clutch.

As illustrated in FIG. 8, the rolling element 150 is inserted into each pocket 156 of the cage 151. The friction plate 158 is attached to an opening-side of each pocket 156. On the other hand, the bearing 136 is attached to the base portion 124a of the accessory driving pulley 124. The claw 170 and the spring 173 for urging the claw 170 to the side of the pulley are attached to each of the grooves 142. The guide 175 for preventing the claws 170 from slipping off outwardly is adjacently fit onto the bearing 136. These components are assembled to one another such that each of the grooves 152 of the cage 151 coincides with an associated one of the grooves 142 of the accessory driving pulley 124. Then, the bearing 135 is attached between an end portion of the extension portion 124b and the crank connecting pulley 123.

Figure 9:
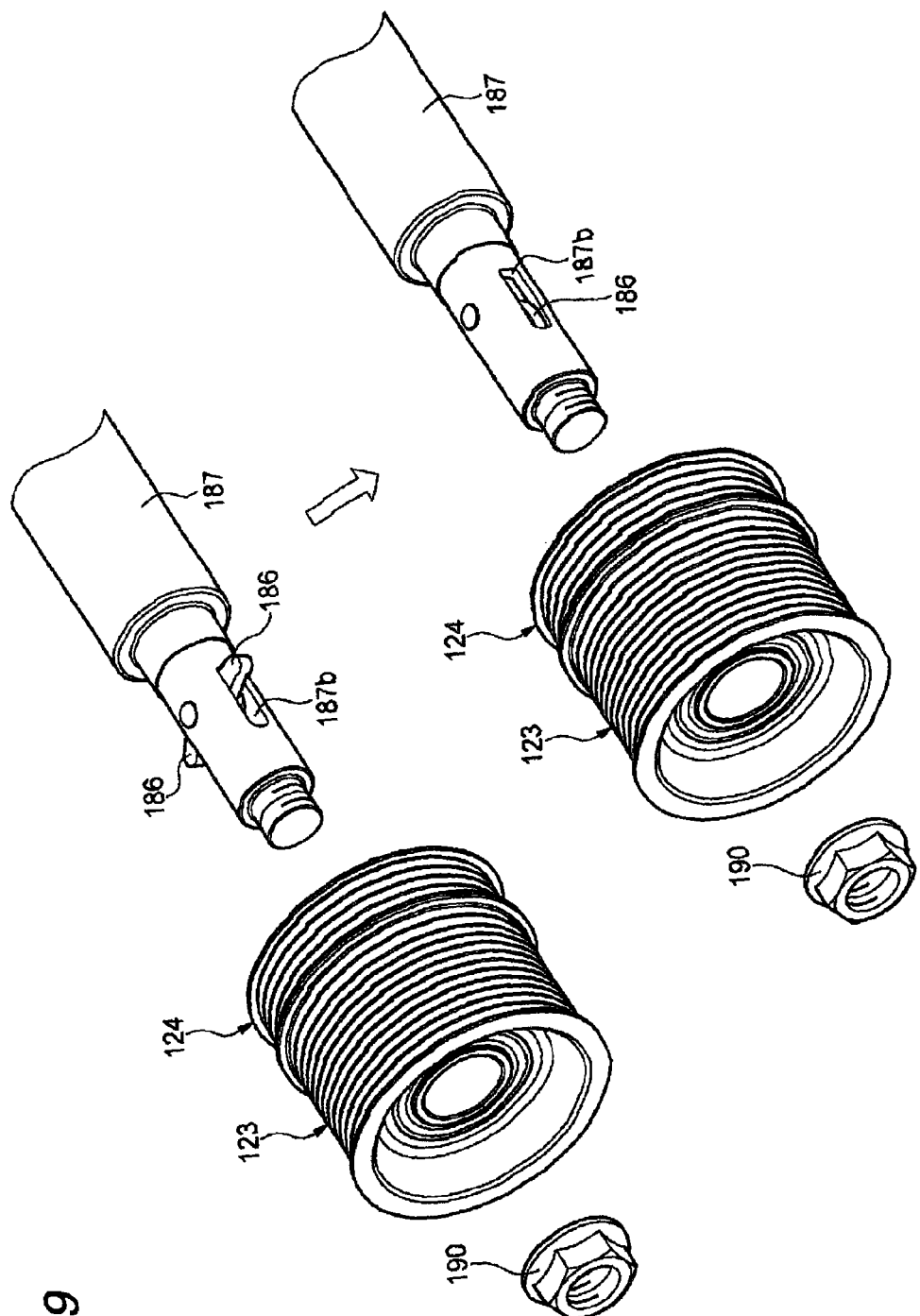
FIG. 9 is an explanatory view illustrating the assembly of the composing-members of the shaft and the pulley constituting the mechanical clutch.

When the crank connecting pulley 123 and the accessory driving pulley 124 assembled to each other in this manner are attached to the shaft 187, the levers 186 are accommodated in the shaft 187, as illustrated in FIG. 9. In addition, each lever opening 187b, the associated groove 142 of the accessory driving pulley 124, and the associated groove 152 of the cage 151 are aligned with one another. Then, the crank connecting pulley 123 and the accessory driving pulley 124 are attached to the shaft 187. Finally, the crank connecting pulley 123 and the accessory driving pulley 124 are fixed to each other by providing a shaft nut 190 at an end of the pulley 123 so as not to axially move. Thus, the pulley portion and the actuator 180 of the vehicular power transmission apparatus 100 of the invention are assembled to each other.

Figure 11:
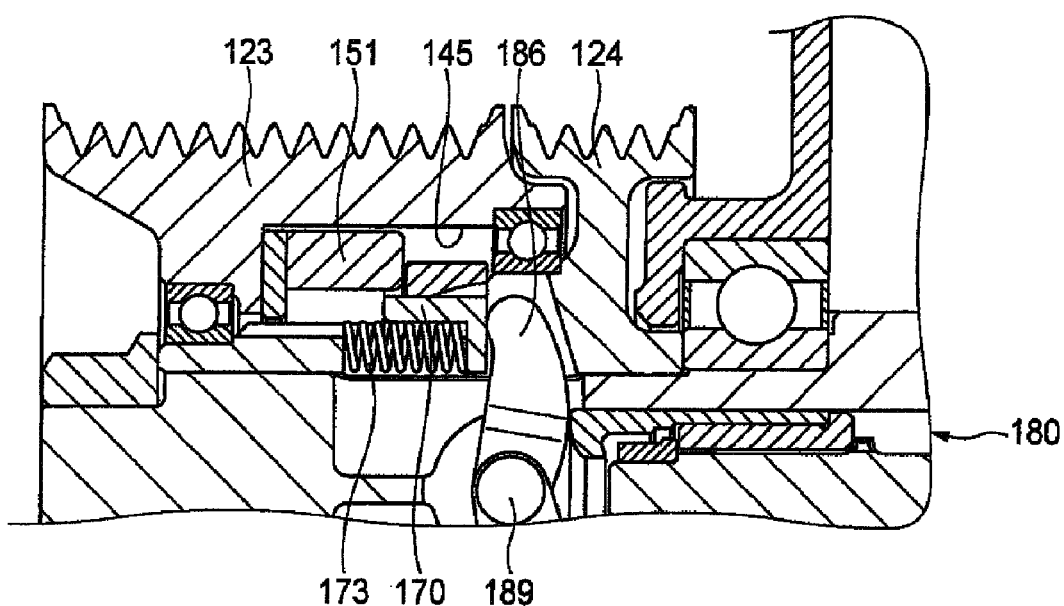
FIG. 11 is a cross-sectional view illustrating an axially primary part of the mechanical clutch at switching off (clutch engagement)

Next, a clutch operation to be performed using the mechanical clutch 105 and the switching unit 132 is described with reference to FIGS. 10 to 15. FIGS. 10 to 12 illustrates the clutch operation in a case where the switching is off and the crank connecting pulley 123 and the accessory driving pulley 124 are engaged with each other.

Although the actuator 180 abuts against each lever 186, the urging force of the spring 173 is larger than the pressing force of the actuator 180. Thus, the claws 170 are not inserted into the grooves 152. At that time, each rolling element 150 held by the cage 151 can move on both end portions of the associated cam surface 141. The mechanical clutch 105 is in a state of a two-way clutch. Further, when the rolling element 150 is placed at an end portion of the associated cam surface 141, each of the tilted surfaces 171 of the claws 170 is set to be able to abut against the associated guide inclined surface 154 of the cage 151.

In a case where the engine 102 serves as a drive element and the motor generator 103 serves as a driven element in this state, the relative speed of the crank connecting pulley 123 with respect to the speed of the accessory driving pulley 124 is higher than that of the accessory driving pulley 124. Thus, in a case where the direction of rotation is assumed to be that of arrow illustrated in FIG. 12, the inner circumferential surface 145 of the crank connecting pulley 123 positioned at an outside-diameter side moves faster than the extension portion 124b of the accessory driving pulley 124. Consequently, each rolling element 150 is engaged between the inner circumferential surface 145 of the crank connecting pulley 123 and the end portion 141a of the associated cam surface 141 placed in the direction of rotation thereof. Accordingly, the crank connecting pulley 123 and the accessory driving pulley 124 rotate integrally. At that time, the driving force of the crank connecting pulley 123 is transmitted to the cam surface 141 via the rolling elements 150. The tilted surface 171 of each of the claws 170, which is opposite to the direction of rotation of this claw, abuts against and pushes the associated guide inclined surface 154 of the cage 151. Consequently, simultaneously, the driving force is transmitted from the rolling elements 150 to the accessory driving pulley 124 via the cage 151, the claws 170 and the input/output shaft 110.

On the other hand, in a case where the motor generator 103 serves as a drive element, and where the engine 102 serves as a driven element, the relative speed of the accessory driving pulley 124 with respect to the speed of the crank connecting pulley 123 is higher than that of the crank connecting pulley 123. Thus, the extension portion 124b of the accessory driving pulley 124 moves faster than the inner circumferential surface 145 of the crank connecting pulley 123. Consequently, each rolling element 150 is engaged between the inner circumferential surface 145 of the crank connecting pulley 123 and the end portion 141b of the associated cam surface 141 placed in a direction opposite to the direction of rotation thereof. Accordingly, the crank connecting pulley 123 and the accessory driving pulley 124 rotate integrally. At that time, the driving force of the accessory driving pulley 124 is transmitted to the cam surface 141 via the rolling elements 150. In addition, the tilted surface 171 in the direction of rotation of each of the claws 170 abuts against and pushes the associated guide inclined surface 154 of the cage 151. Simultaneously, the driving force is transmitted to the crank connecting pulley 123.

Thus, the mechanical clutch 105 serves as a two-way clutch that implements the following two modes:

a mode in which the crank connecting pulley 123 rotates accompanying with the accessory driving pulley 124 in the direction of rotation thereof when the switching is off, i.e., the switching unit 132 does not insert the claws 170 into the grooves 152 of the cage 151 by using the actuator 180; and another mode in which the accessory driving pulley 124 rotates accompanying with the crank connecting pulley 123 in the direction of rotation thereof.

Figure 14:
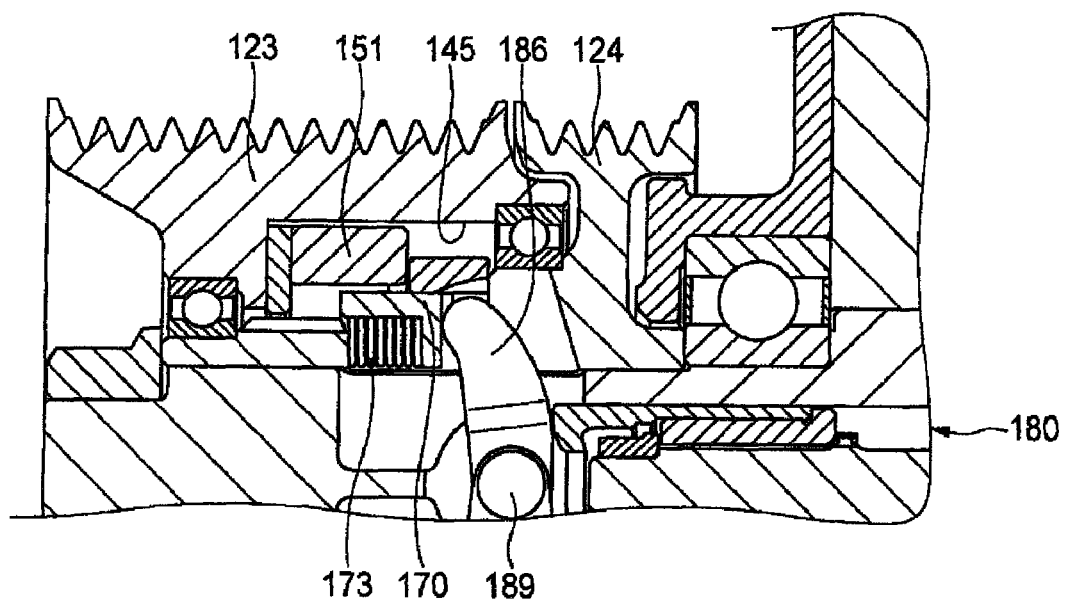
FIG. 14 is a cross-sectional view illustrating an axially primary part of the mechanical clutch at switching on (clutch disengagement)
Figure 15:
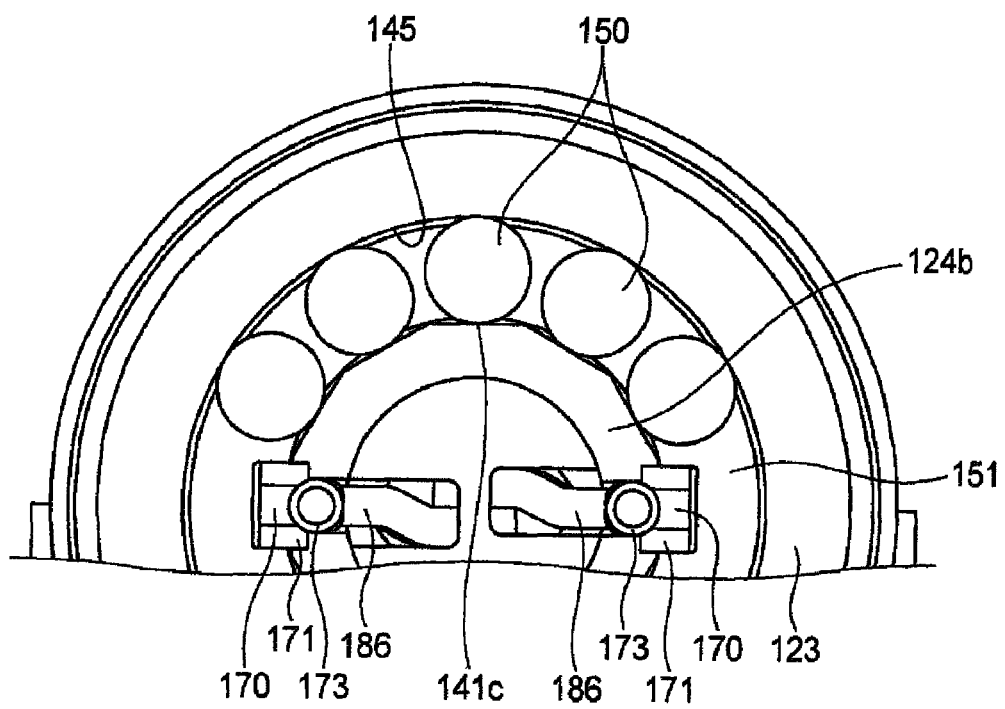
FIG. 15 is a cross-sectional view illustrating a radially primary part of the mechanical clutch at switching on (clutch disengagement)

FIGS. 13 to 15 illustrate the clutch operation when the switching is turned on and the crank connecting pulley 123 and the accessory driving pulley 124 are not engaged with each other.

The actuator 180 abuts against and pushes each lever 186, with a pressing force that is slightly larger than the urging force of the spring 173. Thus, the lever 186 rotates slightly around the lever pin 189. Consequently, the claws 170 are inserted into the grooves 152 of the cage 151. At that time, the cage 151 is rotated a minute angle by the claws 170. Then, the position of the cage 151 is fixed. When the position of the cage 151 is fixed, the position of each rolling element 150 on the associated cam surface 141 is determined.

Here, in a first embodiment, a disengagement state of the clutch is achieved, in which the engagement between the crank connecting pulley 123 and the accessory driving pulley 124 is inhibited regardless of which of the crank connecting pulley 123 and the accessory driving pulley 124 serves as a drive element by causing the claws 170 to fix the position of the cage 151 such that the position of each rolling element 150 is a midpoint position 141c on the associated cam surface 141.

On the other hand, in a second embodiment, a one-way clutch is implemented, in which the engagement between the crank connecting pulley 123 and the accessory driving pulley 124 is inhibited only when the accessory driving pulley Is provided as a drive element by causing the claws 170 to fix the position of the cage 151 such that the position of each rolling element 150 is shifted from a midpoint position on the associated cam surface 141 towards one of both sides thereof.

Hereinafter, the first and second embodiments are described in detail.

First Embodiment

FIG. 15 is a cross-sectional view illustrating the case where the claws 170 fix the position of the cage 151 such that the position of each rolling element 150 according to the first embodiment is a midpoint position 141c on the associated cam surface 141.

A slight gap is formed between each rolling element 150 on the associated flat surface 141 and the annular inner circumferential surface 145. No driving force is transmitted between the crank connecting pulley 123 and the accessory driving pulley 124. That is, whichever of the engine 102 and the motor generator 103 serves as a drive element (or driven element), each rolling element 150 is fixed at the midpoint position 141c. No rolling element 150 engages the crank connecting pulley 123 and the accessory driving pulley 124. Thus, the switching unit 132 achieves a clutch disengagement state in which the engagement between the crank connecting pulley 123 and the accessory driving pulley 124 is inhibited, whichever of the crank connecting pulley 123 and the accessory driving pulley 124 is provided as a drive element.

Figure 16:
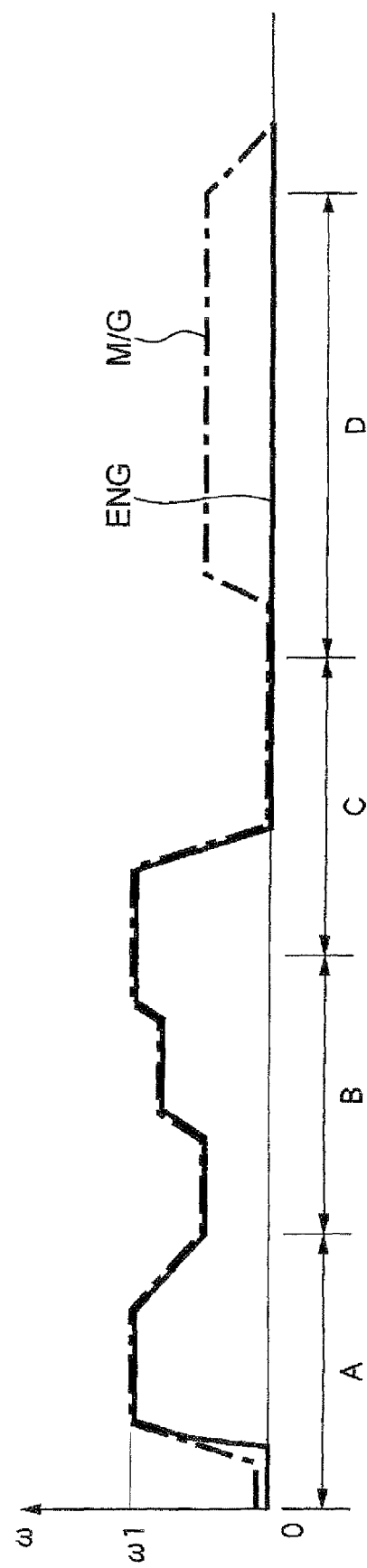
FIG. 16 is a graph illustrating change in the number of rotations of each of an engine and a motor generator.
Figure 17:
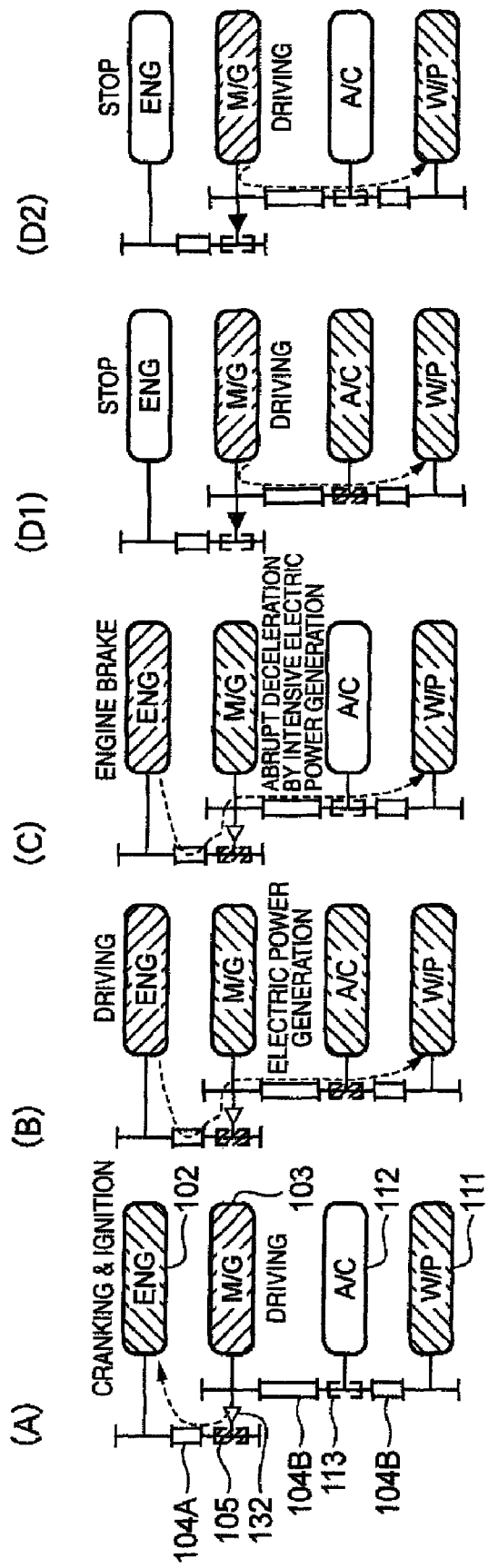
FIG. 17 is a schematic diagram illustrating operating states of the mechanical clutch, the water pump, and an air conditioner compressor in intervals A to D illustrated in FIG. 16, according to a first embodiment.

Hereinafter, operations of the engine 102, the motor generator 103, the mechanical clutch 105, the water pump 111, and the air conditioner compressor 112 according to a first embodiment of the vehicular power transmission apparatus 100 are described with reference to FIGS. 16 and 17. FIG. 16 is a graph illustrating change in the number of rotations of each of the engine 102 and the motor generator 103. FIG. 17 is a schematic diagram illustrating operating states of the mechanical clutch 105, the water pump 111, and the air conditioner compressor 112 in intervals A to D illustrated in FIG. 16. Incidentally, in FIG. 16, a solid line represents the number of rotations of the engine 102. An alternate long and short dash line represents the number of rotations of the motor generator 103. Incidentally, in FIG. 17, the configurations (B) to (D2) are similar to that (A). Thus, reference numerals are omitted.

The interval A corresponds to a process of starting the engine 102 by the motor generator 103. As illustrated in (A) of FIG. 17, the switching unit 132 is turned off in while disengaging the compressor clutch 113 of the air conditioner compressor 112 for reducing a load. Then, the engagement of the mechanical clutch 105 for engaging or disengaging the power between the engine 102 and the motor generator 103 is enabled. Then, the motor generator 103 is driven to increase the number of rotations thereof to an engine starting rotation number co1. Thus, the engine 102 is caused to be driven to ignite the engine 102.

At that time, the relative speed of the accessory driving pulley 124 with respect to the speed of the crank connecting pulley 123 is higher than the relative speed of the crank connecting pulley 123. Accordingly, the extension portion 124b of the accessory driving pulley 124 at the inside-diameter side moves faster than the inner circumferential surface 145 of the crank connecting pulley 123. Consequently, each rolling element 150 is engaged between the inner circumferential surface 145 of the crank connecting pulley 123 and the end portion 141b of the cam surface 141 placed in a direction opposite to the direction of rotation thereof. Thus, the crank connecting pulley 123 and the accessory driving pulley 124 can rotate integrally.

The interval B corresponds to a state in which the water pump 111 and the air conditioner compressor 112 are driven by the engine 102. After the engine 102 is ignited, in the interval B, the relationship between the drive element and the driven element respectively selected from a pair of the engine 102 and the motor generator 103 is reversed to the relationship in the interval A. That is, the relative speed of the crank connecting pulley 123 with respect to the speed of the accessory driving pulley 124 is higher than the relative speed of the accessory driving pulley 124.

At that time, as illustrated in (B) of FIG. 17, the switching unit 132 is turned off to thereby enable the engagement of the mechanical clutch 105. Thus, the inner circumferential surface 145 of the crank connecting pulley 123 placed at the outside-diameter side moves faster than the extension portion 124b of the accessory driving pulley 124. Each rolling element 150 is engaged between the inner circumferential surface 145 of the crank connecting pulley 123 and the end portion 141a of the cam surface 141 placed in the direction of rotation thereof. Accordingly, the crank connecting pulley 123 and the accessory driving pulley 124 rotate integrally. Consequently, the water pump 111 and the air conditioner compressor 112 are driven by the engine 102. In addition, the motor generator 103 is caused to generate electric power. Further, even when the vehicle is stopped, the water pump 111 and the air conditioner compressor 112 are driven by the engine 102, e.g., as the generation of electric power generation is required.

The interval C corresponds to a process of reducing the speed of and stopping the engine 102 by the motor generator 103. As illustrated in (C) of FIG. 17, when the vehicle is stopped, or when the vehicle is brought into a mode in which motor drive running is performed, the engine 102 is stopped.

At that time, the switching unit 132 is turned off to thereby enable the engagement of the mechanical clutch. Thus, the motor generator 103 can be caused to generate electric power. At that time, in order to cause the vehicle to immediately pass through a resonance point thereof and reduce vibrations thereof while stopping the engine 102, an amount of electric energy generated by the motor generator 103 is increased, and reduction in the number of rotations of the engine 102 is accelerated. Thus, the engine 102 is immediately stopped. In an example illustrated in (C) of FIG. 17, the disengagement of the compressor clutch 113 is performed. The input shaft 118 of the compressor 112 is separated from the second power transmission unit 104B. However, the engagement of the compressor clutch 113 can be performed, so that the input shaft 118 of the air conditioner compressor 112 can be connected to the second power transmission unit 104B. In this case, time required to stop the engine 102 can be more shortened by using the air conditioner compressor 112 as a load.

The interval D corresponds to a state in which the motor generator 103 drives the water pump 111 and the air conditioner compressor 112. When the engine is stopped while the vehicle is stopped, or during what is called an idling stop, or when the engine is stopped while running by using the motor generator 103 is performed, the switching unit 132 is turned on to thereby achieve the disengagement state of the mechanical clutch 105. Consequently, whichever of the crank connecting pulley 123 and the accessory driving pulley 124 serves as a drive element (or a driven element), the connection between the crank connecting pulley 123 and the accessory driving pulley 124 is inhibited. Thus, the motor generator 103 drives the water pump 111 and the air conditioner compressor 112 independent of the engine 102, as illustrated in (D1) of FIG. 17. Alternatively, the disengagement of the compressor clutch 113 of the air conditioner compressor 112 is performed, and the water pump 111 is driven by the motor generator 103 independent of the engine 102, as illustrated in (D2) of FIG. 17.

Figure 18:
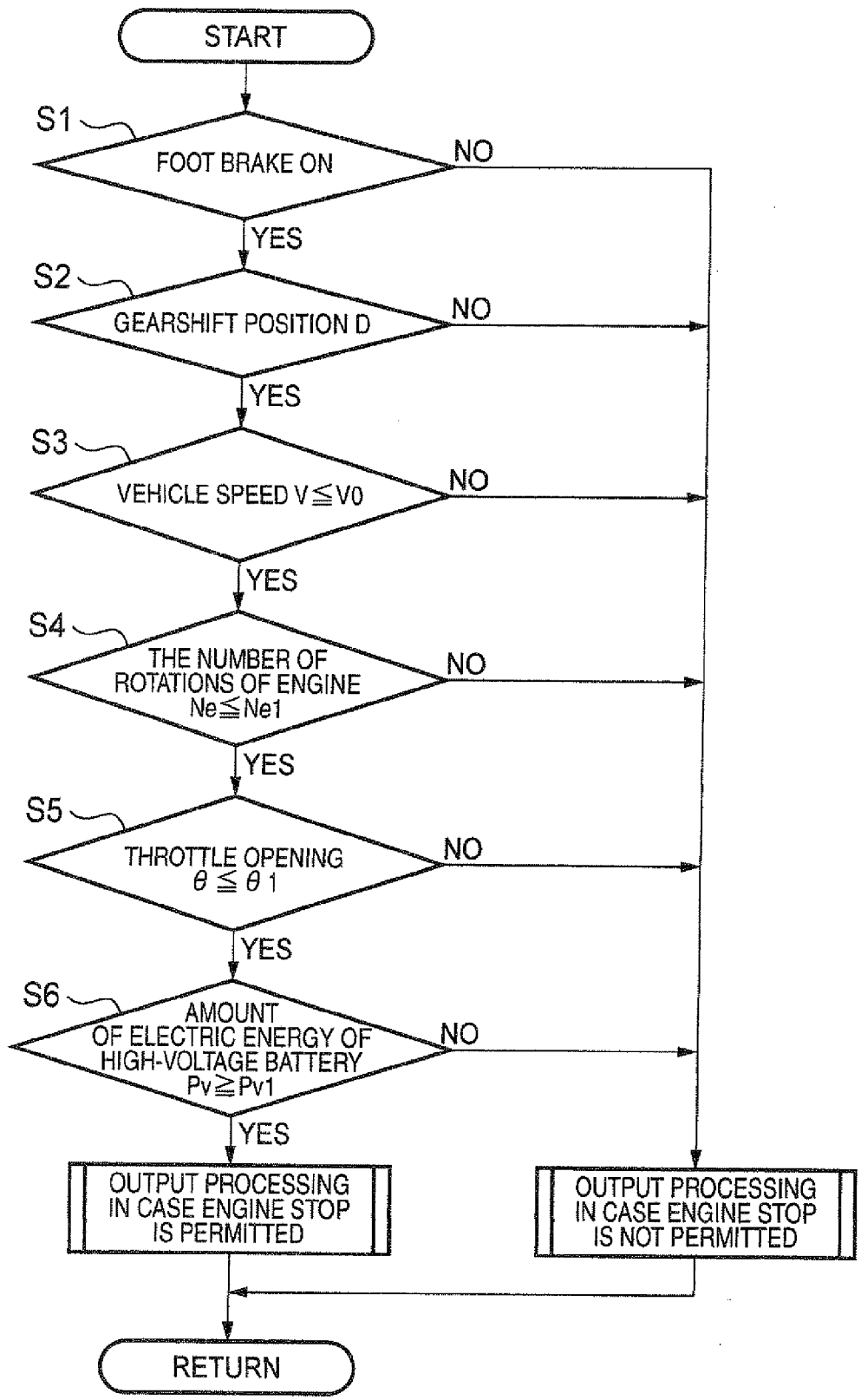
FIG. 18 is a flowchart illustrating an example of an engine start/stop determination routine to be executed by an electronic control unit (ECU) when a vehicle is stopped.

In the vehicular power transmission apparatus 100 constructed as described above, the ECU 106 detects an operating state of a foot brake, a gearshift position, a vehicle speed, the number of rotations of the engine 102, a throttle opening, and an amount of electric energy of the high-voltage battery 107. Then, the ECU 106 determines, based on such detected information, whether the engine 102 is started or stopped. FIG. 18 illustrates an example of a routine for determining whether the engine 102 is started or stopped, which is executed by the ECU 106, when the vehicle is stopped.

As illustrated in FIG. 18, in step S1, the ECU 106 detects an operating state of a foot brake. This step is performed to check a driver's intention to stop a vehicle. If the driver does not put on the foot brake, the ECU 106 determines that an engine stop is not permitted.

If the driver puts on the foot brake, the ECU 106 subsequently detects a gearshift position in step S2. This step is performed to confirm that the driver intends to temporarily stop the vehicle in order to wait for a traffic light to change or intends to tentatively stop the vehicle at a stop sign, and that the driver does not intend to park for a long-term while idling.

When the gearshift position is not a running position, such as a drive position (D-position), the ECU 106 determines that an engine stop is not permitted.

When the gearshift position is a running position, such as a drive position (D-position), the ECU 106 detects a vehicle speed in step S3. This step is performed to check whether the vehicle does not run at an extremely low speed V0, and whether the vehicle is in a state in which an idling stop is possible. If the vehicle speed V is neither equal to nor less than V0, the ECU 106 determines that an engine stop is not permitted.

If the vehicle speed V is equal to or lower than V0, the ECU 106 subsequently detects the number "Ne" of rotations of the engine 102 in step S4. This step is performed to continue an operation of the engine 102 in a case where the number Ne of rotations of the engine 102 exceeds the number Ne1 (e.g., 750 revolutions per minute (rpm)) of idling rotations of the engine 102 in a normal accessory operation state, e.g., in a case where the warm-up of the engine 102 is being performed, or where a load due to the accessory is increased using an air conditioner to a very high value. If the number Ne of rotations of the engine 102 is not Ne1 or lower, the ECU 106 determines that an engine stop is not permitted.

If the number Ne of rotations of the engine 102 is equal to or lower than Ne1, the ECU 106 subsequently detects a throttle opening θ in step S5. This step is performed to check a driver's intention to stop a vehicle, based on the fact that the throttle opening θ is associated with an operation of an accelerator. If the throttle opening θ is not equal to or less than a predetermined opening θ1, the ECU 106 determines that an engine stop is not permitted.

If the throttle opening θ is equal to or less than a predetermined opening θ1, the ECU 106 subsequently detects an amount Pv of electric energy of the high-voltage battery 107 in step S6. If an amount Pv of electric energy of the high-voltage battery 107 is less than an amount Pv1 of electric energy, which is slightly higher than an amount of electric energy needed when the engine 102 is started by driving the moor/generator 103, the ECU 106 determines that an engine stop is not permitted. Then, the ECU 106 starts the engine 102. Alternatively, the ECU 106 causes the engine 102 to continue an operation. Then, the ECU 106 causes the motor generator 103 to generate electric power, so that the high-voltage battery 107 is charged. On the other hand, if the amount Pv of electric energy of the high-voltage battery 107 is equal to or higher than Pv1, the ECU 106 determines that an engine stop is permitted.

Figure 19:
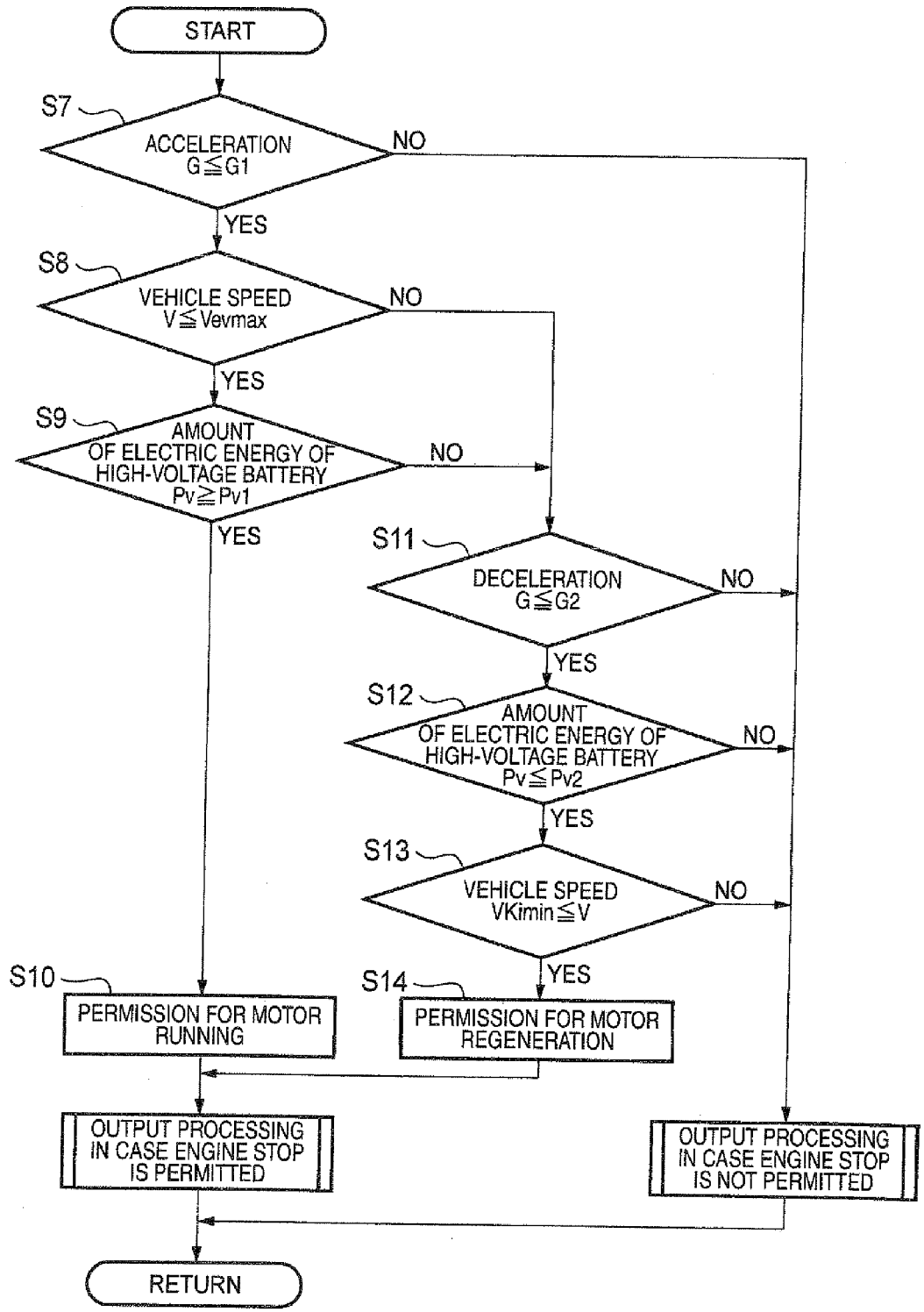
FIG. 19 is a flowchart illustrating an example of an engine start/stop determination routine to be executed by the ECU when a vehicle runs.

Next, FIG. 19 illustrates an example of a routine for determining whether the engine 102 is started or stopped, which is executed by the ECU 106, while the vehicle is running.

As illustrated in FIG. 19, in step S7, the ECU 106 detects an acceleration. This step is performed to confirm that the vehicle runs at an acceleration G which is higher than a motor drive running allowable acceleration G1 that is an allowable acceleration due to motor drive running, and whether the vehicle is put into a state in which motor drive running can be performed. If the acceleration G is equal to or less than G1, the ECU 106 determines that an engine stop is not permitted.

If the acceleration G is equal to or lower than G1, the ECU 106 subsequently detects a vehicle speed in step S8. This step is performed to confirm that the vehicle runs at a speed that is higher than a motor drive cruise running upper-limit speed Vevmax which is the upper limit speed at which of the motor drive cruise running is performed, and whether the vehicle is brought into a state in which motor drive running can be performed. If the vehicle speed V is equal to or lower than Vevmax, the ECU 106 detects a deceleration in step S11.

If the vehicle speed V is equal to or lower than Vevmax, the ECU 106 subsequently detects an amount of electric energy of the high-voltage battery 107 in step S9. If an amount Pv of electric energy of the high-voltage battery 107 is less than a motor drive running possible battery charging rate Pv1 that is an amount of electric energy which is slightly higher than an amount of electric energy needed by the vehicle to perform motor drive running by driving the motor generator 103, the ECU 106 detects a deceleration in step S11.

If the amount Pv of electric energy of the high-voltage battery 107 is equal to or higher than the amount Pv1, in step S10, the ECU 106 permits the vehicle to perform motor drive running. Then, the ECU 106 determines that an engine stop is permitted.

In step S11, the ECU 106 detects a deceleration. This step is performed to check a driver's intention to stop the vehicle by an engine brake after it is determined in steps S7 to S9 that motor drive running is impossible. If a deceleration G is neither equal to nor lower than a motor drive running allowable deceleration G2, the ECU 106 determines that an engine stop is not permitted.

If the deceleration G is equal to or lower than the motor drive running allowable deceleration G2, the ECU 106 detects an amount of electric energy of the high-voltage battery 107 in step S12. If the amount Pv of electric energy of the high-voltage battery 107 is higher than a deceleration regeneration acceptable battery charging rate Pv2 that is an allowable charging rate of the high-voltage battery 107 at the time of using the motor generator 103 as a generator, the ECU 106 determines that an engine stop is not permitted.

When the amount Pv of the high-voltage battery 107 is equal to or lower than the deceleration regeneration acceptable battery charging rate Pv2, the ECU 106 detects a vehicle speed V in step S13. If the vehicle speed V is lower than a deceleration engine stop lower limit speed Vkimin required to use the motor generator 103 as a generator, the ECU 106 determines that an engine stop is not permitted.

When the vehicle speed V is equal to or higher than the deceleration engine stop lower limit speed Vkimin, the ECU 106 permits motor regeneration in step S14, and determines that an engine stop is permitted.

Figure 20:
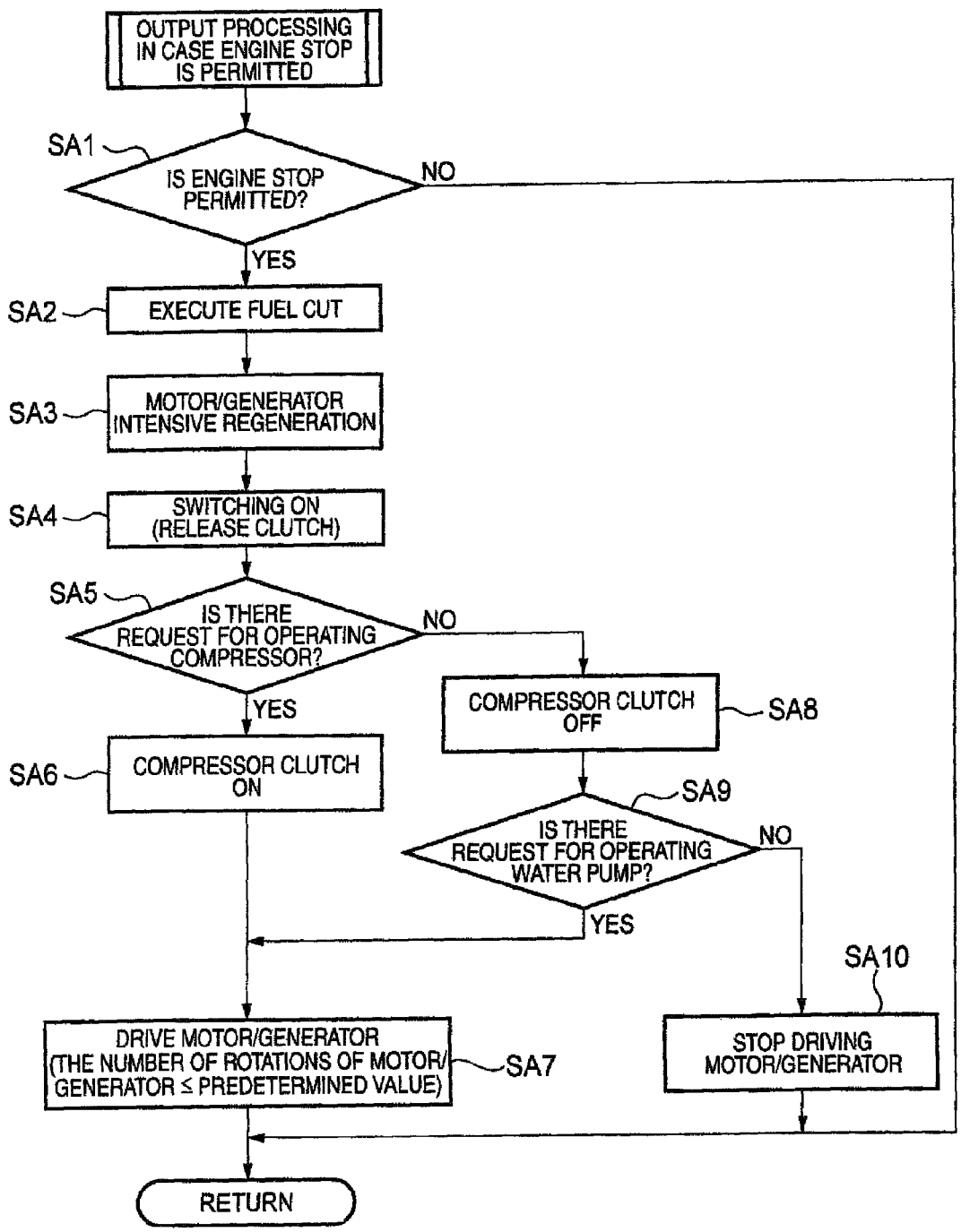
FIG. 20 is a flowchart illustrating processing to be performed when the ECU according to the first embodiment of the invention determines that an engine stop is permitted.

FIG. 20 is a flowchart illustrating output processing to be performed when the ECU 106 according to the first embodiment of the invention determines that the engine 102 is permitted to stop. As illustrated in FIG. 20, first, in step SA1, the ECU L106 confirms that the engine 102 is permitted to stop. If the engine 102 is not permitted to stop, the ECU 106 finishes the processing.

When the engine 102 is permitted to stop, the ECU 106 subsequently stops fuel supply to the engine 102 in step SA2. At that time, in step SA3, the ECU 106 increases an amount of electric energy generated by the motor generator 103 and causes the motor generator 103 to perform intensive regeneration, as illustrated in the interval C in FIG. 16 and in (C) of FIG. 17. Thus, the ECU 106 accelerates reduction in the number of rotations of the engine 102 and immediately stops the engine 102. Consequently, time required to stop the engine 102 can be shortened by using the motor generator 103 as a load.

Subsequently, in step SA4, the switching unit 132 is turned on to disengage the mechanical clutch 105. Consequently, the engagement between the crank connecting pulley 123 and the accessory driving pulley 124 is inhibited, and the connection or disconnection of the power between the engine 102 and the motor generator 103 is performed.

After the engine 102 is stopped, in step SA5, the ECU 106 detects whether there is a request for operating the compressor 112. If there is a request for operating the compressor 12, in step SA6, the ECU 106 performs the engagement of the compressor clutch 113 to thereby engage the input shaft 118 of the compressor 112 with the second power transmission unit 104B. Then, the ECU 106 drives the motor generator 103 at a predetermined number of revolutions (e.g., 750 rpm) or lower in step SA7. Consequently, as illustrated in the interval D in FIG. 16 and in (D1) of FIG. 17, the air conditioner compressor 112 and the water pump 111 are driven by the motor generator 103.

If there is no request for operating the compressor 112, in step SA8, the ECU 106 disengages the compressor clutch 113 of the air conditioner compressor 112. Subsequently, in step SA9, the ECU 106 checks whether it is necessary to operate the water pump 111. If it is unnecessary to operate the water pump 111, in step SA10, the ECU 106 stops the motor generator 103. On the other hand, if it is necessary to operate the water pump 111, in step SA7, the ECU 106 drives the motor generator 103 at a certain number of revolutions (e.g., 750 rpm) or lower. Consequently, as illustrated in the interval D in FIG. 16 and in (D2) of FIG. 17, the water pump 111 is driven by the motor generator 103.

Figure 21:
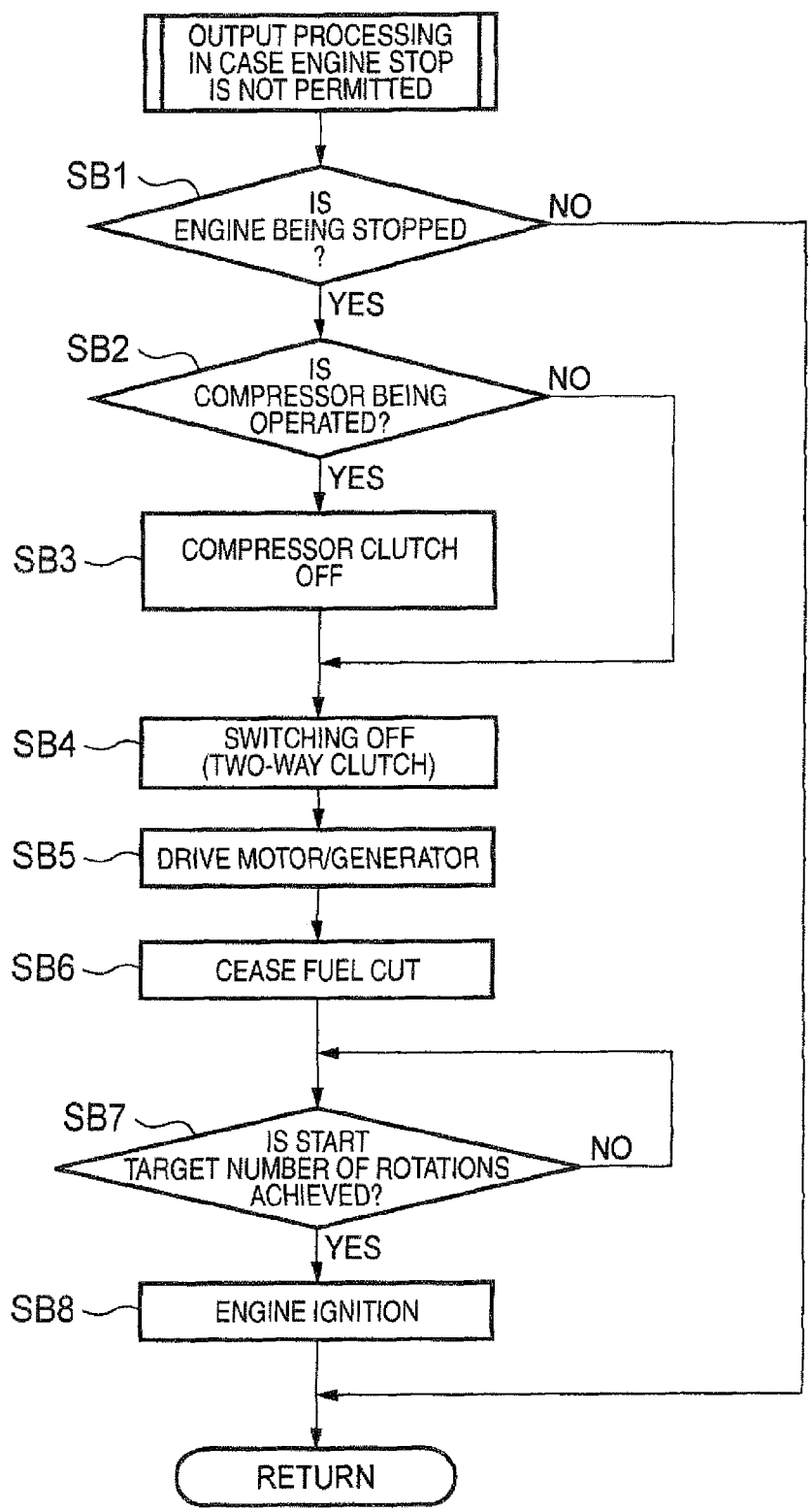
FIG. 21 is a flowchart illustrating processing to be performed when the ECU according to the first embodiment of the invention determines that an engine stop is not permitted.

FIG. 21 is a flowchart illustrating output processing to be performed when the ECU 106 according to the first embodiment of the invention determines that an engine stop is not permitted. As illustrated in FIG. 21, first, in step SB1, the ECU 106 detects whether the engine 102 is being stopped. If the engine 102 is not being stopped, the ECU 106 finishes the processing.

If the engine 102 is being stopped, the ECU 106 subsequently detects an operating state of the compressor 112 in step SB2. If the compressor 112 is not operated, in step SB4, the switching unit 132 is turned off to thereby cause the mechanical clutch 105 to serve as a two-way clutch. Further, if the compressor 112 is operated, in step SB3, the ECU 106 performs the disengagement of the compressor clutch 113 to thereby separate the input shaft 118 of the compressor 112 from the second power transmission unit 104B. Subsequently, the switching unit 132 is turned off to thereby cause the mechanical clutch 105 to serve as a two-way clutch engaging or disengaging between the engine 102 and the motor generator 103. Consequently, the transmission of the power between the crank connecting pulley 123 and the accessory driving pulley 124 can be achieved.

Subsequently, in step SB5, the ECU 106 drives the motor generator 103. Then, in step SB6, the ECU 106 opens a fuel valve and starts the supply of fuel to the engine 102. In step SB7, as illustrated in the interval A in FIG. 16 and in (A) of FIG. 17, the number of rotations of the engine 102 is increased to the starting number ω1 of rotations thereof. In step SB8, the ECU 106 ignites the spark plug of the engine 102 and starts the engine 102.

Second Embodiment

Next, a second embodiment will be described below. The second embodiment differs from the first embodiment in that each rolling element 150 is set at a position shifted slightly from a midpoint position 141c of the associated cam surface to one of sides of this cam surface.

This shifted position is a position at which the engagement of the mechanical clutch 105 is performed when the engine 102 serves as a drive element and where the motor generator 103 serves as a driven element. Alternatively, the shifted position is a position at which the disengagement of the mechanical clutch 105 is performed when the engine 102 serves as a driven element and where the motor generator 103 serves as a drive element. That is, when the engine 102 serves as a drive element and the motor generator 103 serves as a driven element, the relative speed of the crank connecting pulley 123 with respect to the speed of the accessory driving pulley 124 is higher than that of the accessory driving pulley 124. Consequently, each rolling element 150 is engaged between the inner circumferential surface 145 of the crank connecting pulley 123 and the end portion of the associated cam surface placed in the direction of rotation thereof. Accordingly, the crank connecting pulley 123 and the accessory driving pulley 124 rotate integrally. On the other hand, when the engine 102 is provided as a driven element, and where the motor generator 103 serves as a drive element, the relative speed of the accessory driving pulley 124 with respect to the speed of the crank connecting pulley 123 is higher than that of the crank connecting pulley 123. Thus, each rolling element 150 is not contacted with the inner circumferential surface 145 of the crank connecting pulley 123 placed at the outside-diameter side Accordingly, the power transmission between the crank connecting pulley 123 and the accessory driving pulley 124 is not performed. With such a configuration, according to the second embodiment, the switching unit 132 inhibits the engagement between the crank connecting pulley 123 and the accessory driving pulley 124 only when the accessory driving pulley 124 serves as the drive element. Consequently, a one-way clutch is implemented.

Figure 22:
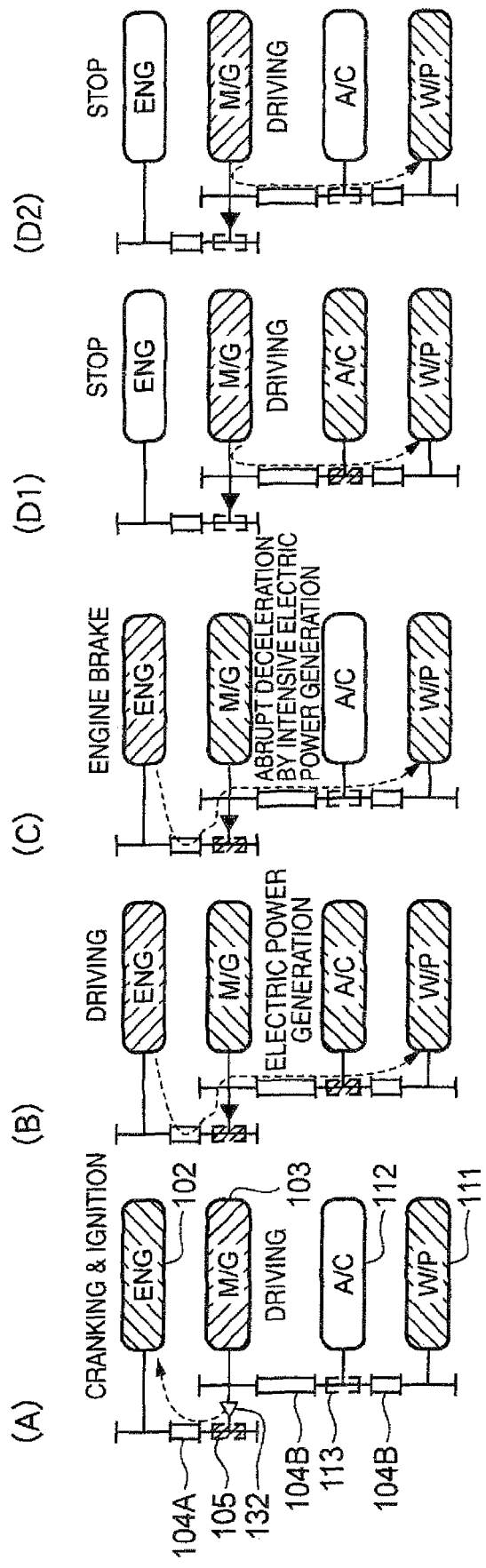
FIG. 22 is a schematic diagram illustrating operating states of the mechanical clutch, the water pump, and the air conditioner compressor in the intervals A to D illustrated in FIG. 16, according to a second embodiment.

Hereinafter, as illustrated in FIGS. 16 and 22, the engine 102, the motor generator 103, the mechanical clutch 105, the water pump 111, and the air conditioner compressor 112 of the vehicular power transmission apparatus 100 according to the second embodiment are described. FIG. 22 is a schematic diagram illustrating operating states of the mechanical clutch 105, the water pump 111, and the air conditioner compressor 112 in each of the intervals A to D illustrated in FIG. 16.

The interval A corresponds to a process of starting the engine 102 by the motor generator 103. As illustrated in (A) of FIG. 22, the switching unit 132 is turned off while disengaging the compressor clutch 113 of the air conditioner compressor 112 for reducing a load. Then, the engagement of the mechanical clutch 105 is enabled. Then, the motor generator 103 is driven to increase the number of rotations thereof to an engine starting rotation number ω1. Thus, the engine 102 is caused to be driven to ignite the engine 102. At that time, the relative speed of the accessory driving pulley 124 with respect to the speed of the crank connecting pulley 123 is higher than the relative speed of the crank connecting pulley 123. Accordingly, the extension portion 124b of the accessory driving pulley 124 at the inside-diameter side moves faster than the inner circumferential surface 145 of the crank connecting pulley 123. Consequently, each rolling element 150 is engaged between the inner circumferential surface 145 of the crank connecting pulley 123 and the end portion 141b of the cam surface 141 placed in a direction opposite to the direction of rotation thereof. Thus, the crank connecting pulley 123 and the accessory driving pulley 124 can rotate integrally.

The interval B corresponds to a state in which the water pump 111 and the air conditioner compressor 112 are driven by the engine 102. After the engine 102 is ignited, in the interval B, the relationship between the drive element and the driven element respectively selected from a pair of the engine 102 and the motor generator 103 is reversed to the relationship in the interval A. That is, the relative speed of the crank connecting pulley 123 with respect to the speed of the accessory driving pulley 124 is higher than the relative speed of the accessory driving pulley 124. At that time, as illustrated in (B) of FIG. 22, the switching unit 132 is turned on to thereby put the mechanical clutch 105 into a state of a one-way clutch which engages only when the engine 102 serves as a drive element. Thus, the inner circumferential surface 145 of the crank connecting pulley 123 placed at the outside-diameter side moves faster than the extension portion 124b of the accessory driving pulley 124. Each rolling element 150 is engaged between the inner circumferential surface 145 of the crank connecting pulley 123 and the end portion 141a of the cam surface 141 placed in the direction of rotation thereof. Accordingly, the crank connecting pulley 123 and the accessory driving pulley 124 rotate integrally. Consequently, the water pump 111 and the air conditioner compressor 112 are driven by the engine 102. In addition, the motor generator 103 is caused to generate electric power. Further, even when the vehicle is stopped, the water pump 111 and the air conditioner compressor 112 are driven by the engine 102, e.g., as the generation of the electric power is required.

The interval C corresponds to a process of reducing the speed of and stopping the engine 102 by the motor generator 103. As illustrated in (C) of FIG. 22, the switching unit 132 is turned on to thereby put the mechanical clutch 105 into a state of a one-way clutch which engaging only when the engine 102 serves as a drive element. Thus, the motor generator 103 can be caused to generate electric power. At that time, in order to cause the vehicle to immediately pass through a resonance point thereof and reduce vibrations thereof while the engine 102 is stopped, an amount of electric energy generated by the motor generator 103 is increased, and reduction in the number of rotations of the engine 102 is accelerated. Thus, the engine 102 is immediately stopped.

In an example illustrated in (C) of FIG. 22, the compressor clutch 113 is disengaged and the input shaft 118 of the compressor 112 is separated from the second power transmission unit 104B. However, it is adaptable to engage the compressor clutch 113 so that the input shaft 118 of the air conditioner compressor 112 is connected to the second power transmission unit 104B. In this case, time required to stop the engine 102 can be more reduced using the air conditioner compressor 112 as a load.

The interval D corresponds to a state in which the motor generator 103 drives the water pump 111 and the air conditioner compressor 112. When the engine is stopped while the vehicle is stopped, or during what is called an idling stop, or when the engine is stopped while running using the motor generator 103 is performed, the switching unit 132 is turned on to thereby put the mechanical clutch 105 into a state of one-way clutch which engages therebetween only when the engine 102 serves as the drive element. Consequently, when the engine 102 does not serve as a drive element, each rolling element 150 is not contacted with the inner circumferential surface 145 of the crank connecting pulley 123 placed at the outside-diameter side. Thus, the transmission of power between the crank connecting pulley 123 and the accessory driving pulley 124 is not performed. That is, the motor generator 103 drives the water pump 111 and the air conditioner compressor 112, independent of the engine 102, as illustrated in (D1) of FIG. 22. Alternatively, the compressor clutch 113 of the air conditioner compressor 112 is disengaged, and the water pump 111 is driven by the motor generator 103, independent of the engine 102, as illustrated in (D2) of FIG. 22.

Figure 23:
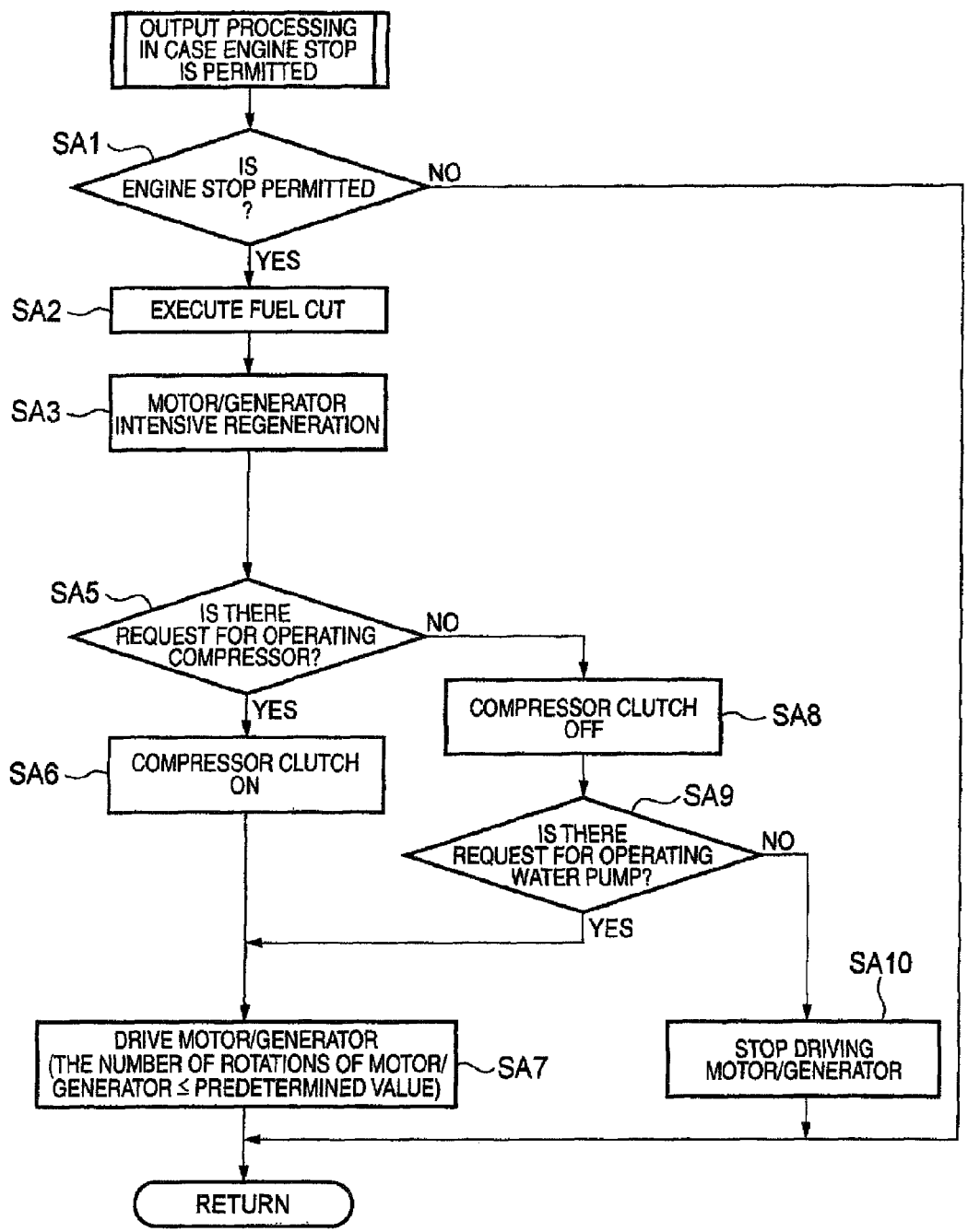
FIG. 23 is a flowchart illustrating processing to be performed when an ECU according to the second embodiment of the invention determines to permit an engine stop.

FIG. 23 is a flowchart illustrating output processing to be performed when the ECU 106 according to the second embodiment of the invention determines, based on the processes illustrated in FIGS. 18 and 19, that an engine 102 stop is permitted. In FIG. 23, the same step as the step illustrated in FIG. 20 is designated with the same reference numeral as that used to designate the same step illustrated in FIG. 20. Thus, the description of such a step is omitted.

The flow according to the second embodiment illustrated in FIG. 23 differs from that according to the first embodiment in that there is no step in the former flow, which corresponds to the step SA4 according to the first embodiment of FIG. 20, for the following reason. That is, in the second embodiment, the switching unit 132 is turned on to thereby put the mechanical clutch 105 into a state of a one-way clutch. Thus, when the motor generator 103 drives the crank connecting pulley 123 and the accessory driving pulley 124, power is not transmitted therebetween. Accordingly, the process to be performed in the interval C illustrated in FIG. 16 is changed to that to be performed in the interval D illustrated in FIG. 16, there is no necessity for changing an off-state of the switching unit 132 to an on-state thereof to thereby bring the mechanical clutch 105 into a disengagement state, similarly to the first embodiment.

Figure 24:
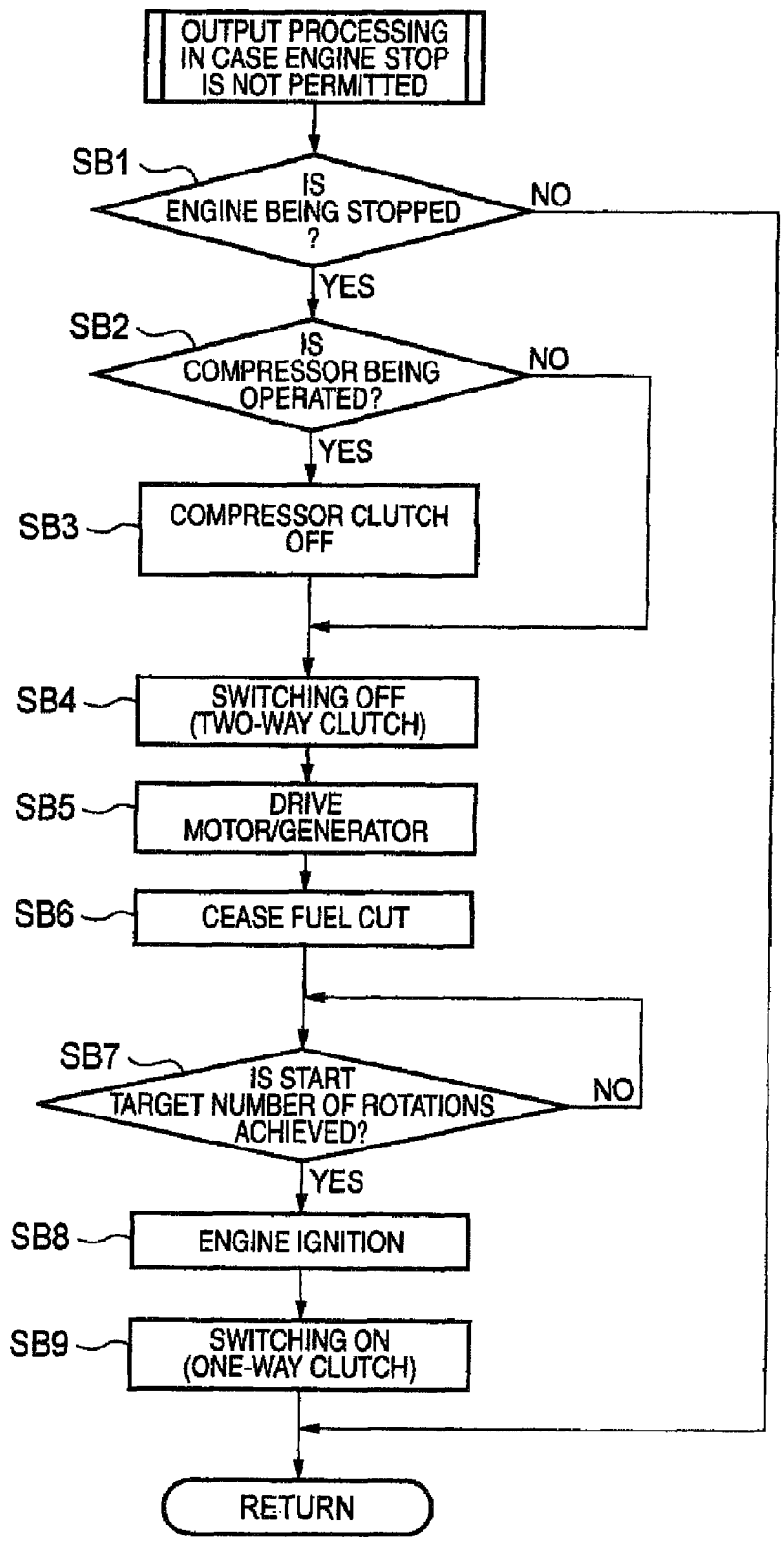
FIG. 24 is a flowchart illustrating processing to be performed when the ECU according to the second embodiment of the invention determines not to permit an engine stop.
Figure 25:
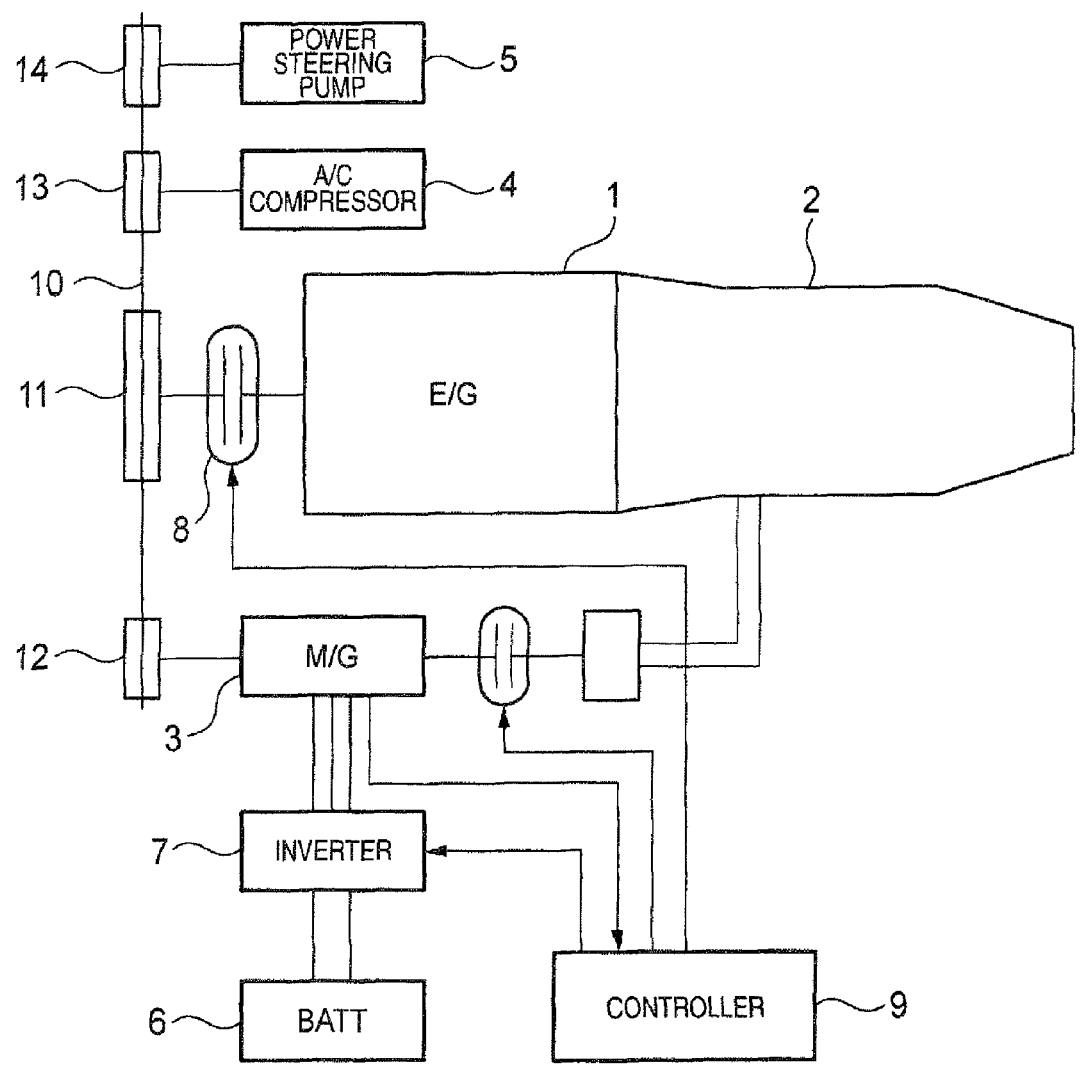
FIG. 25 is a block diagram illustrating a vehicular power transmission apparatus described in JPA-11-147424.

FIG. 24 is a flowchart illustrating output processing to be performed when the ECU 106 according to the second embodiment of the invention determines that an engine stop is not performed. In FIG. 24, the same step as the step illustrated in FIG. 21 is designated with the same reference numeral as that used to designate the same step illustrated in FIG. 21. Thus, the description of such a step is omitted.

According to the second embodiment illustrated in FIG. 24, in addition to the steps according to the first embodiment illustrated in FIG. 21, after the engine is ignited (step SB8), the switching unit 132 is turned on to thereby put the mechanical clutch 105 into a state of a one-way clutch. Consequently, the second embodiment is configured so that after the engine 102 is ignited, power is transmitted by the one-way clutch when the engine 102 serves as a drive element and the motor generator 103 serves as a driven element in the intervals B and C illustrated in FIG. 16, and that when the motor generator 103 in the interval D illustrated in FIG. 16 serves as a drive element, power is not transmitted between the engine 102 and the motor generator 103 by the one-way clutch.

Incidentally, the invention is not limited to the aforementioned embodiments but other various changes and improvements are possible. Also, the materials, shapes, dimensions, numerals, types, number, arrangement positions, and the like of the respective composing elements of the aforementioned embodiments are not limitative but can be selected arbitrarily, as long as the present invention is achieved.

What is claimed is:

1. A vehicular power transmission apparatus comprising:
an engine;
a crank pulley connected to a crankshaft of the engine;
a motor generator;
a motor generator pulley comprising:
  a first pulley connected to an input/output shaft of the motor generator relatively rotatably therewith; and
  a second pulley connected directly to the input/output shaft of the motor generator,
  wherein the first and second pulley are connected to and provided coaxially with the input/output shaft of the motor generator;
an accessory;
an accessory pulley connected to an input shaft of the accessory;
a first power transmission unit adapted to transmit power by laying a first transmission member at least around the crank pulley and the first pulley;
a second power transmission unit adapted to transmit power by laying a second transmission member at least around the second pulley and the accessory pulley;
a mechanical clutch adapted to engage and disengage between the first pulley and the second pulley; and a switching unit adapted to switch the mechanical clutch so as to inhibit an engagement therebetween when at least one of the first pulley and the second pulley serves as a drive element,
wherein the mechanical clutch and the switching unit are provided in the motor generator pulley;
wherein the second pulley comprises an extension portion which axially extends towards the first pulley,
the extension portion comprises a plurality of cam surfaces,
a cavity is defined between an inner circumferential surface of the first pulley and the extension portion of the second pulley,
a plurality of rolling elements,
a cage is disposed between the cam surface and the inner circumferential surface of the first pulley for holding each rolling element therebetween, and
the mechanical clutch comprises the cam surface, the inner circumferential surface of the first pulley, the plurality of rolling elements, and the cage; and
wherein the switching unit comprises:
  a first groove formed on at least a part of the extension portion so as to extend in axial direction;
  a second groove formed on a part of the cage at a portion corresponding to the first groove so as to extend in axial direction; and
  a claw movable between the first and second grooves, and
the claw is adapted to be inserted and removed from between the first and second grooves so as to fix a position of the cage and release the position of the cage, respectively.

2. The vehicular power transmission apparatus according to claim 1, wherein
the switching unit inhibits the engagement between the first pulley and the second pulley by fixing the position of the cage such that each of the rolling elements is placed at a radially midpoint position of the cam surface.

3. The vehicular power transmission apparatus according to claim 1, wherein
the switching unit causes the engagement between the first pulley and the second pulley when the claw fixes the position of the cage such that each of the rolling elements is placed at a radially midpoint position of the cam surface, when one of the first pulley and the second pulley serves as a drive element.

4. The vehicular power transmission apparatus according to claim 1, wherein
guide inclined surfaces for guiding insertion of the claw are respectively provided at both circumferential ends of the second groove of the cage, and
tilted surfaces respectively corresponding to the guide inclined surfaces are provided at both circumferential sides of a tip end portion of the claw respectively.

5. The vehicular power transmission apparatus according to claim 4, wherein
an insertion unit which inserts the claw into the second groove of the cage is provided on the input/output shaft of the motor generator.

6. The vehicular power transmission apparatus according to claim 1, wherein
the first pulley is pivotally supported on the second pulley by two bearings provided at an end part of the extension portion and a base portion of the second pulley, respectively, and
the first pulley radially laps over at least a part of the second pulley.

7. The vehicular power transmission apparatus according to claim 1, further comprising:
an idle pulley and a tensioner pulley, which are adapted to add tensional force to the first transmission member from an outer circumferential side of the first transmission member,
wherein the idle pulley is disposed coaxially with the accessory pulley and relatively rotatably therewith, and
the tensioner pulley is provided at a side opposite to the accessory pulley with respect to the first transmission member.

8. The vehicular power transmission apparatus according to claim 7, wherein
the accessory pulley has an extension portion which extends towards an end portion of an input shaft of the accessory, and
the idle pulley is supported on the extension portion of the accessory pulley via a bearing.

9. The vehicular power transmission apparatus according to claim 8, wherein
the first pulley and the second pulley have substantially the same diameter, and
the accessory pulley and the idle pulley have substantially the same diameter.

10. A vehicular power transmission apparatus comprising:
an engine;
a crank pulley connected to a crankshaft of the engine,
a motor generator;
a motor generator pulley including a first pulley and a second pulley, which are connected to and juxtaposed with each other on an input/output shaft of the motor generator;
an accessory;
an accessory pulley connected to input shafts of the accessory;
a first power transmission unit configured to transmit power by laying a first transmission member at least around the crank pulley and the first pulley; and
a second power transmission unit configured to transmit power by laying a second transmission member at least around the second pulley and the accessory pulley, wherein:
the first pulley is connected to the input/output shaft of the motor generator relatively rotatable therewith;
the second pulley is connected directly to the input/output shaft of the motor generator;
a mechanical clutch configured to connect and disconnect the first pulley and the second pulley constituting the motor generator pulley is provided in the motor generator;
a switching unit configured to switch the clutch so as to inhibit, when at least one of the first pulley and the second pulley serves as a drive element, the first pulley and the second pulley from being connected to each other is provided in the motor generator;
the second pulley comprises an extension portion which axially extends towards the first pulley;
the extension portion comprises a plurality of cam surfaces;
a cavity is defined between an inner circumferential surface of the first pulley and the extension portion of the second pulley;
plural rolling elements are provided;
a cage is disposed between the cam surfaces and the inner circumferential surface of the first pulley for holding each rolling element therebetween;

the mechanical clutch comprises the cam surfaces, the inner circumferential surface of the first pulley and the cage;

the switching unit, configured to switch the clutch, includes an actuator;

the actuator is provided in the input/output shaft of the motor generator;

an idle pulley and a tensioner pulley, which are adapted to add tensional force to the first transmission member from an outer circumferential side of the first transmission member;

the idle pulley is disposed coaxially with the accessory pulley and relatively rotatably therewith;

the tensioner pulley is provided at a side opposite to the accessory pulley with respect to the first transmission member;

the accessory pulley has an extension portion which extends towards an end portion of an input shaft of the accessory;

the idle pulley is supported on the extension portion of the accessory pulley via a bearing;

the first pulley and the second pulley have substantially the same diameter; and the accessory pulley and the idle pulley have substantially the same diameter.

* * * * *